US 6,744,420 B2

(12) United States Patent
Mohri

(10) Patent No.: US 6,744,420 B2
(45) Date of Patent: Jun. 1, 2004

(54) OPERATION INPUT APPARATUS USING SENSOR ATTACHABLE TO OPERATOR'S HAND

(75) Inventor: Koh Mohri, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 240 days.

(21) Appl. No.: 09/871,380

(22) Filed: May 31, 2001

(65) Prior Publication Data

US 2002/0012014 A1 Jan. 31, 2002

(30) Foreign Application Priority Data

Jun. 1, 2000 (JP) .................... 2000-164904
Jun. 16, 2000 (JP) .................... 2000-181950
Jul. 7, 2000 (JP) .................... 2000-207403

(51) Int. Cl.$^7$ .................... G09G 5/08
(52) U.S. Cl. .................... 345/157; 345/158
(58) Field of Search .................... 345/156–158, 345/863, 8, 474; 414/1–7; 901/33, 34

(56) References Cited

U.S. PATENT DOCUMENTS

| 5,097,252 | A | | 3/1992 | Harvill et al. | |
|---|---|---|---|---|---|
| 6,115,482 | A | * | 9/2000 | Sears et al. | 382/114 |
| 6,198,485 | B1 | * | 3/2001 | Mack et al. | 345/419 |
| 6,515,669 | B1 | * | 2/2003 | Mohri | 345/474 |

FOREIGN PATENT DOCUMENTS

| JP | 9-21650 | 1/1997 |
|---|---|---|
| JP | 9-62437 | 3/1997 |
| JP | 2000-132305 | 5/2000 |
| JP | 2001-125728 | 5/2001 |

* cited by examiner

*Primary Examiner*—Regina Liang
(74) *Attorney, Agent, or Firm*—Frishauf, Holtz, Goodman & Chick, P.C.

(57) ABSTRACT

There is disclosed an operation input apparatus comprising a posture sensor attached to a finger, and a command generator for generating a command based on an output of the posture sensor. The posture sensor is attached to all of a first link portion, second link portion and third link portion of at least one finger.

4 Claims, 14 Drawing Sheets

| MOVEMENT DIRECTION | OUTPUT COORDINATE AXIS | 15X | | 15Y | | 15Z | |
|---|---|---|---|---|---|---|---|
| | | y | z | z | x | x | y |
| TRANSLATION | +X | 0 | 0 | 0 | -x | +x | 0 |
| | +Y | +y | 0 | 0 | 0 | 0 | -y |
| | +Z | 0 | -z | +z | 0 | 0 | 0 |
| ROTATION | +α(X) | 0 | 0 | +z | 0 | 0 | +y |
| | +β(Y) | 0 | +z | 0 | 0 | +x | 0 |
| | +γ(Z) | +y | 0 | 0 | +x | 0 | 0 |

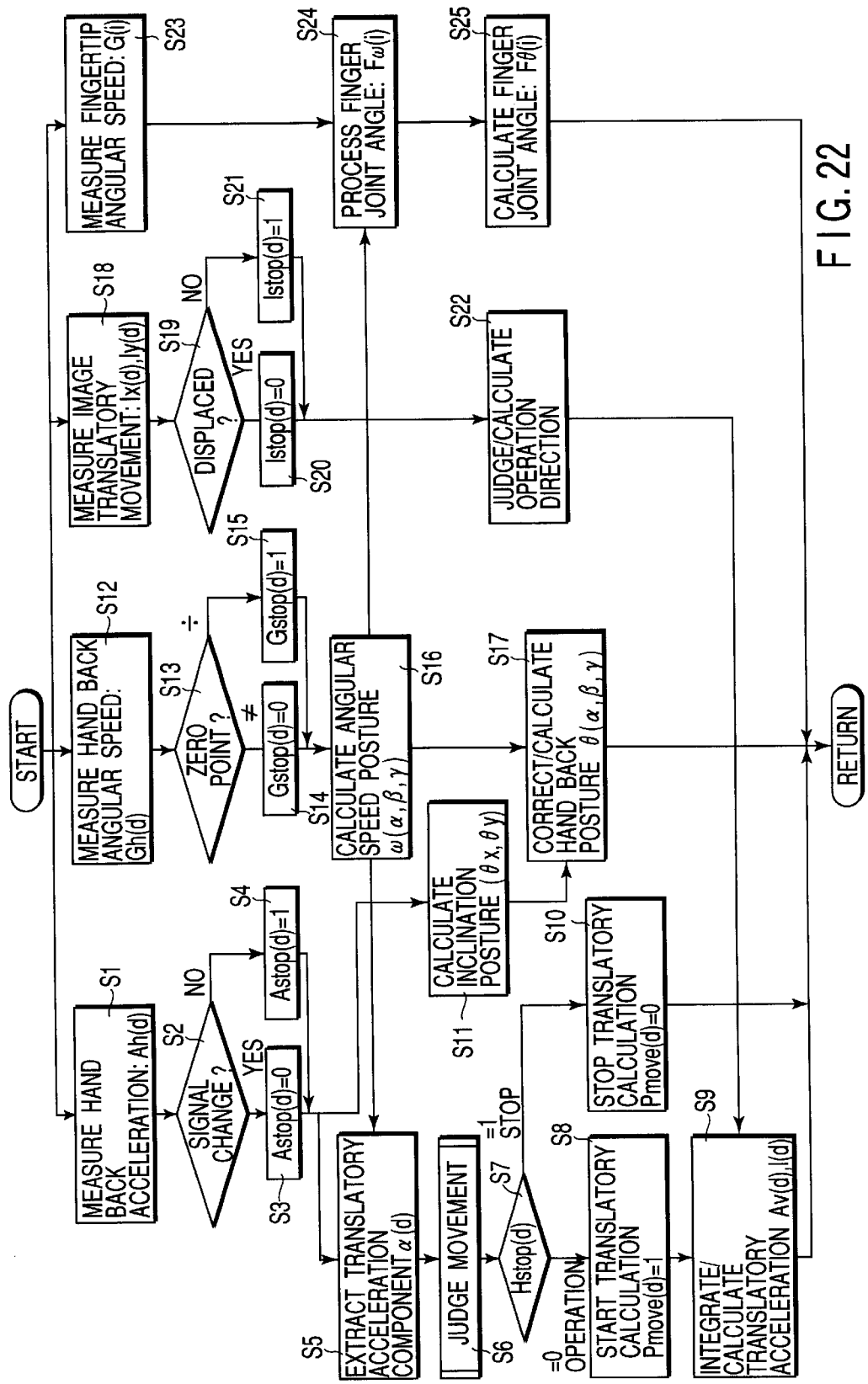
F I G. 22

OPERATION INPUT APPARATUS USING SENSOR ATTACHABLE TO OPERATOR'S HAND

CROSS-REFERENCE TO RELATED APPLICATIONS

This application is based upon and claims the benefit of priority from the prior Japanese Patent Applications No. 2000-164904, filed Jun. 1, 2000; No. 2000-181950, filed Jun. 16, 2000; and No. 2000-207403, filed Jul. 7, 2000, the entire contents of all of which are incorporated herein by reference.

BACKGROUND OF THE INVENTION

The present invention relates to an operation input apparatus, particularly to an operation input apparatus for use in a computer, game machine, and other various machines.

A technique of attaching a sensor to an operator's hand, detecting a hand shape and movement and generating a signal based on a detection result has heretofore been known.

For example, disclosed in U.S. Pat. No. 5,097,252 is a technique of constituting a sensor by connecting a light source and optical sensor via an optical fiber or another light guide path and attaching a plurality of the sensors to a hand joint to detect a bend of the joint.

Moreover, disclosed in Jpn. Pat. Appln. KOKAI Publication No. 62437/1997 is a computer input apparatus as a substitute for a mouse, in which two acceleration sensors are disposed on the back of a gloved hand to detect a two-dimensional movement of the hand, and one strain gauge is disposed in a joint portion of a forefinger to detect a bending/stretching movement of the forefinger.

Furthermore, disclosed in a patent application by the present applicant (Jpn. Pat. Appln. No. 302236/1998) is an operation input apparatus in which a triaxial angular speed sensor and triaxial acceleration sensor for detecting a position and posture are disposed on the back of the hand, a uniaxial angular speed sensor for detecting a finger bending is disposed in an end of the forefinger, end of a middle finger, and an end and middle portion of a thumb, a hand shape is estimated from the position/posture of the hand back and the posture of the finger, and a command signal is generated based on the hand shape.

Additionally, in a patent application (Jpn. Pat. Appln. No. 307076/1999), the present inventor discloses a technique of sensing acceleration accompanying the movement with the sensor attached to an operator's body, and correcting an influence of the acceleration with the movement, so that the operator even in a mobile unit such as a car can use the operation input apparatus.

In the method described in Jpn. Pat. Appln. No. 302236/1998 or 307076/1999 of the present inventor, the position and posture of the operator's hand back are detected by the triaxial angular speed sensor and triaxial acceleration sensor, the finger posture is detected by the uniaxial angular speed sensor attached to the finger end, the hand shape is estimated based on this data, and the command signal is generated based on the hand shape. Compared with the method of disposing the sensor in the joint portion in U.S. Pat. No. 5,097,252 and Jpn. Pat. Appln. KOKAI Publication No. 62437/1997, the proposed method determines the sensor position without consideration of hand size. Therefore, there can be provided an operation input apparatus which can be easily utilized by anyone.

(First Problem)

However, the method described in Jpn. Pat. Appln. No. 302236/1998 or 307076/1999 has the following problems, related to application or situation:

1. The constitution in which one angular speed sensor is disposed on fingers other than the thumb and two angular sensors are disposed on the thumb is not suitable for accurately obtaining the hand shape. Therefore, a command precisely adapted for a subtle hand shape and movement cannot be generated.

2. Since the angular speed sensor is attached to the finger end, a distance between the hand back sensor and finger end sensor is large, and a wire from the finger end sensor sometimes obstructs movement.

3. When the sensor is attached to the finger middle portion, the finger movement is small, and a detection amount is therefore reduced.

4. Since many sensors are attached to the hand back, problems of sensor weight, attaching method, and the like have are encountered during attachment.

5. The gripping action can be detected, but the opening/closing movement of fingers cannot be detected. Therefore, a "scissors" gesture cannot be recognized.

These problems occur due to the difference in user and operational purpose, thus the importance of the problems differ depending on the intended use.

(Second Problem)

Moreover, in Jpn. Pat. Appln. No. 302236/1998 or 307076/1999, an acceleration sensor is utilized for detecting the speed and position of a translatory movement of the operator's hand back by integration with time. Therefore, it is difficult to distinguish a hand stopped state from a hand constant-speed movement. There are problems in recognition of a hand gesture in the stopped state and a gesture for moving the hand at a substantially constant speed.

(Third Problem)

Furthermore, since a posture detection sensor for use in the present invention is attached to the body, the sensor needs to be as small and light as possible. However, a high-performance device generally intended to be mounted on an airplane, a ship, or a car, is large-sized, and cannot be attached to the body for use. Moreover, the device is very expensive.

In general, the angular speed sensor is intended to convert an angular speed momentum of a rotary movement around a detection axis, and even an inexpensive sensor has a satisfactory response property, sensitivity and performance in the present proposed purpose. However, because of a signal drift and noise component produced by temperature and environment, an error is caused by an integration processing for obtaining an angle.

Moreover, since the acceleration sensor can measure a gravity direction during stop, there is little drift, and the sensor is basically and frequently used. However, in addition to the acceleration by gravity acceleration, a movement acceleration component by the translatory movement is synthesized. A separation processing is performed by a filtering processing to separate the components, but response properties are deteriorated by these processes.

Therefore, an aim is to use advantageous properties of these posture detection sensors in a harmonized manner and to construct a posture detection sensor which has satisfactory response properties and sensitivity and has little drift.

For the uniaxial angular speed sensor as the finger posture detection sensor in the method described in Jpn. Pat. Appln.

Nos. 302236/1998 and 307076/1999, since there is no reference information to refer to, a finger bend angle reset or overflow processing is performed in accordance with a conscious or unconscious hand open/close movement and an angular speed of the movement. However, when a slow movement is continued, errors are accumulated, and a conscious reset operation is necessary. In order to detect a movement for operation input with a fingertip, the bend angle does not require a high precision, but a certain degree of precision is sometimes required during a substantial stop state.

Moreover, in a method disclosed in Jpn. Pat. Appln. KOKAI Publication No. 21650/1997, there is a problem in that the method cannot be used without guaranteeing rotation around an axis horizontally crossing at right angles to an advancing direction axis. That is, the method cannot be used if movement around the advancing direction axis is added.
(First Object)

Therefore, an object of the present invention is to provide an operation input apparatus which can appropriately solve the aforementioned problems in accordance with various operators and purposes.
(Second Object)

Moreover, another object of the present invention is to provide an operation input apparatus which can accurately recognize the spacial position, posture and movement of an operator's hand.
(Third Object)

Furthermore, another object of the present invention is to provide a posture detection apparatus and operation input apparatus in which a detection output error can be accurately corrected in uniaxial rotation posture detection in three axes.

BRIEF SUMMARY OF THE INVENTION

In order to achieve the aforementioned first object, according to the present invention, there is provided an operation input apparatus comprising: a posture sensor attached to a finger of a hand; and a command generator for generating a command based on an output of the posture sensor. The posture sensor is attached to all of first, second, and third link portions of the finger in at least one finger.

Moreover, according to the present invention, there is provided an operation input apparatus comprising: a posture sensor attached to a finger of a hand; and a command generator for generating a command based on an output of the posture sensor. The posture sensor is attached to only one of the first and second link portions of the finger in at least one finger of the hand, and is not attached to a third link portion of the finger.

Furthermore, according to the present invention, there is provided an operation input apparatus comprising: a posture sensor attached to a finger of a hand; and a command generator for generating a command based on an output of the posture sensor. The posture sensor is attached to only one of second and third link portions of the finger in at least one finger of the hand, and the posture sensor is attached to the first link portion of the finger.

Additionally, according to the present invention, there is provided an operation input apparatus comprising: a posture sensor attached to a finger of a hand; and a command generator for generating a command based on an output of the posture sensor. The posture sensor detects a posture in two axes different in direction from each other, and the operation input apparatus detects a movement for bending the finger and a movement for spreading out the finger based on an output of the posture sensor.

Moreover, according to the present invention, there is provided an operation input apparatus comprising: a first posture sensor attached to a finger of a hand; a second posture sensor attached to a back of the hand; a third sensor, attached to a wrist, for detecting a movement or a posture of the hand; and a command generator for generating a command based on outputs from the first and second posture sensors and an output from the third sensor.

In order to achieve the aforementioned second object, according to the present invention, there is provided a movement detection apparatus for using at least one of an acceleration sensor and an angular speed sensor to detect a movement of an object, the apparatus comprising: image pickup means for taking an image of an environment; comparison means for comparing the images of different time points taken by the image pickup means with one another; and acquirement means for obtaining movement information of the object based on a comparison result of the comparison means.

Moreover, according to the present invention, there is provided an operation input apparatus comprising: hand back detection means, attached to a back of an operator's hand, for detecting at least one of acceleration or angular speed applied to the hand; and operation input analysis means for utilizing a detection result of the hand back detection means to generate a command in a predetermined system. The operation input apparatus further comprises: image pickup means for taking an image of an environment; comparison means for comparing the images of different time points taken by the image pickup means with one another; and acquirement means for obtaining movement information of the hand based on a comparison result of the comparison means.

Furthermore, according to the present invention, there is provided an operation input apparatus comprising: hand back detection means, attached to a back of a hand of an operator, for detecting a movement or a posture of the operator's hand back; finger posture detection means, attached to a finger of the operator, for detecting the posture of the operator's finger; hand shape estimation means for obtaining a shape of the whole hand of the operator based on outputs of the hand back detection means and the finger posture detection means; and operation input analysis means for using the output of the hand shape estimation means to generate a predetermined command. The operation input apparatus further comprises: image pickup means for taking an image of an environment; comparison means for comparing the images of different time points taken by the image pickup means; and acquirement means for obtaining movement information of the hand based on a comparison result of the comparison means.

Additionally, in order to achieve the aforementioned third object, according to the present invention, there is provided a posture detection apparatus for detecting a posture of an object, comprising: posture detection means able to detect the posture around an axis extending in a predetermined direction; first detection means able to detect an acceleration of a first direction different from the predetermined direction; second detection means able to detect the acceleration of a second direction different from the predetermined direction and the first direction; and correction means for using an output of the first detection means and the output of the second detection means to correct the output of the posture detection means.

Moreover, according to the present invention, there is provided an operation input apparatus for using a posture sensor for detecting a posture around an axis of a predetermined direction to detect a hand shape, and generating a command based on a detection result, the apparatus comprising: first detection means able to detect an acceleration of a first direction different from the predetermined direction; second detection means able to detect the acceleration of a second direction different from the predetermined direction and the first direction; and correction means for using an output of the first detection means and the output of the second detection means to correct the output of the posture sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 22 is a flowchart showing a movement detection operation of the operation input apparatus according to the embodiment.

DETAILED DESCRIPTION OF THE INVENTION

Figure 1:
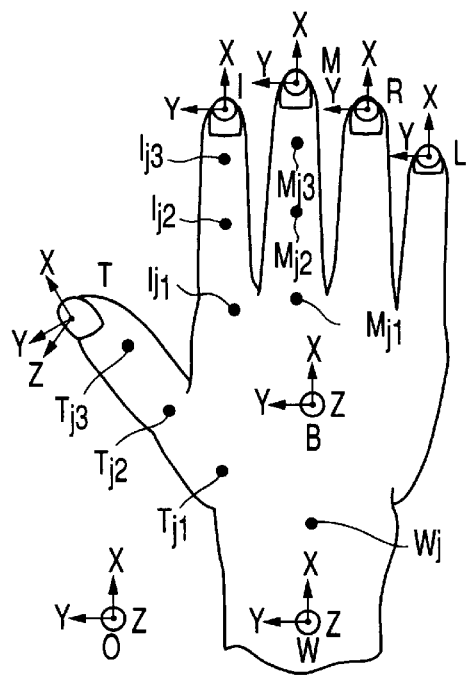
FIG. 1 is a diagram showing a state as viewed from a back of an operator's right hand spread forward.
Figure 2:
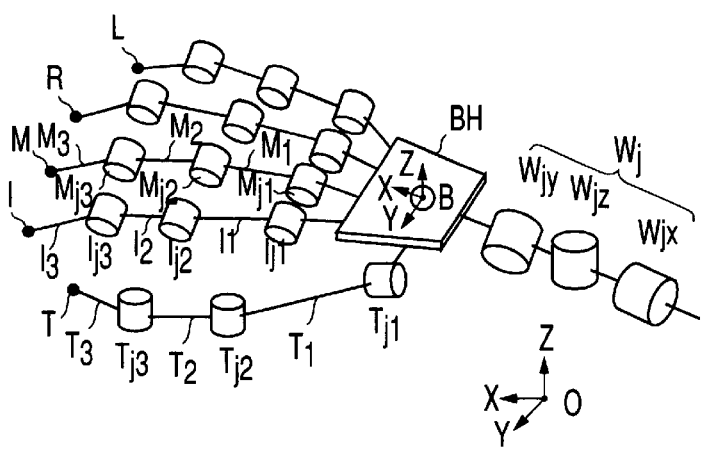
FIG. 2 is a diagram of a model of the operator's right hand shown in FIG. 1.

Embodiments of an operation input apparatus of the present invention will be described hereinafter in detail with reference to the drawings. First, outlines of first to fifth embodiments will be given. FIG. 1 is a diagram showing a state as viewed from a back of an operator's right hand spread forward, and FIG. 2 is a diagram of a model of the operator's right hand shown in FIG. 1.

A coordinate system for respective fingers and joints shown in the drawings will be defined hereinafter. In FIG. 1, a fingertip direction is set to +X axis, a thumb direction is set to +Y axis, and a direction crossing at right angles to an XY plane of the back of the hand and extending upward is set to +Z direction. Additionally, symbols of Z direction of a forefinger (index finger), middle finger, ring finger and little finger are omitted in the drawings.

A right hand orthogonal coordinate system (X, Y, Z) is applied to a wrist, hand back, thumb, forefinger, middle finger, ring finger, and little fingertip (distal phalanx). Thereby, a wrist coordinate system W, hand back coordinate system B, thumb coordinate system T, forefinger coordinate system I, middle finger coordinate system M, ring finger coordinate system R, and little finger coordinate system L are defined. Additionally, respective fingertip coordinate systems are relative coordinate systems with respect to the hand back coordinate system B. Moreover, OXYZ indicates a fixed space coordinate, and the Z axis direction indicates the direction of gravity.

Subsequently, articulation portions (joint portions) corresponding to the carpometacarpal joint, metacarpophalangeal joint (MP), and interphalangeal articulation (IP) of the thumb are defined as Tj1, Tj2, Tj3 respectively. Link portions corresponding to a metacarpal bone, phalanx proximalis, and distal phalanx are defined as T1, T2, T3 (FIG. 2) respectively.

Similarly, for the forefinger, the joint portions corresponding to the metacarpophalangeal joint (MP), central interphalangeal articulation (MIP), and distal interphalangeal articulation (DIP) are respectively defined as Ij1, Ij2, Ij3, and link portions corresponding to phalanx proximalis, phalanx media, and distal phalanx are respectively defined as I1, I2, I3 (FIG. 2).

Furthermore, for the middle finger, the joint portions can be respectively defined as Mj1, Mj2, Mj3, and the link portions can be respectively defined as M1, M2, M3 (FIG. 2). The other two fingers (ring and little fingers) can also be defined in a similar method.

In the drawings, BH denotes the back of the hand. Moreover, Wj denotes the joint portion around the wrist. Furthermore, a joint portion Wjx around an x axis, joint portion Wjy around a y axis, and joint portion around a z axis are shown.

In the coordinate system defined as described above, usually when the operation input apparatus is started, an initialized position corresponds to an origin. Moreover, during initialization, the hand back coordinate system B agrees with the fixed space coordinate OXYZ.

Furthermore, right rotation directions with respect to the advancing directions (+axis directions) of respective coordinate axes of XYZ axes are defined as +Roll direction (X axis), +Pitch direction (Y axis), and +Yaw direction (Z axis).

In this model, the joints of the fingers other than the thumb rotate only in the pitch direction, that is, around Y axis in the coordinate system B, and have a freedom degree of 1. The thumb has a freedom degree of 2, and the wrist has a freedom degree of 3.

Figure 3:
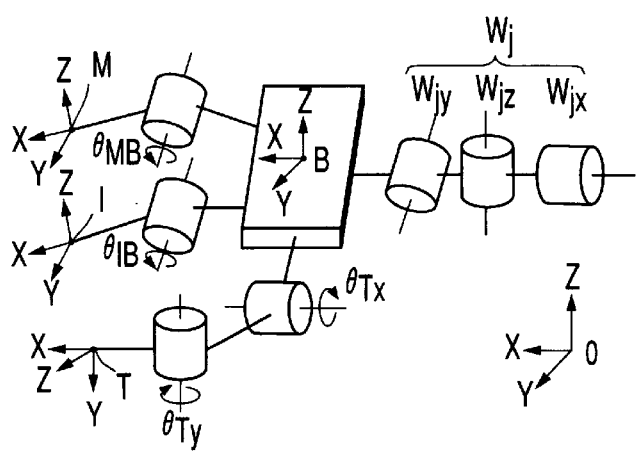
FIG. 3 is a diagram showing a model of a hand shape with three fingers.
Figure 4:
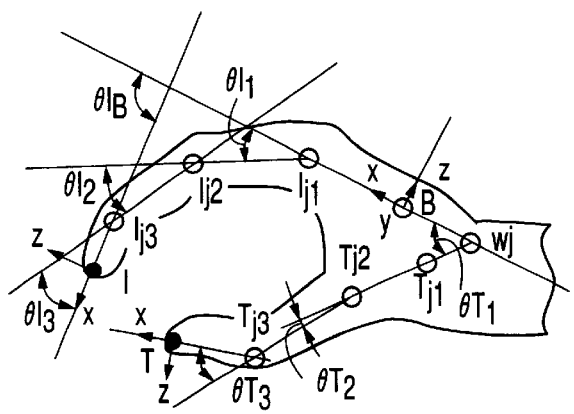
FIG. 4 is a diagram of the operator's right hand as viewed from a side.

FIG. 3 is a diagram showing a model of a hand shape with three fingers, and FIG. 4 is a diagram of the operator's right hand as viewed from a side. FIG. 3 shows a detection coordinate for detecting the position and posture of the hand back in the model, and the angle of each joint to the hand back. Moreover, when a thumb Y-axis rotation angle is θTy, thumb X-axis rotation angle is θTx, forefinger Y-axis rotation angle is θIB, and middle finger Y-axis rotation angle is θMB with respect to the hand back, relative angle information between the adjacent joints can be used to represent respective fingertip angles (posture information of an operation point of the fingertip) by the following equations.

$$\theta IB = \theta I1 + \theta I2 + \theta I3 \text{ (with the forefinger)} \quad (1)$$

$$\theta MB = \theta M1 + \theta M2 + \theta M3 \text{ (with the middle finger)} \quad (2)$$

$$\theta Tx = \theta T1 \text{ (thumb X-axis)} \quad (3)$$

$$\theta Ty = \theta T2 + \theta T3 \text{ (thumb Y-axis)} \quad (4)$$

The fingertip angle is a synthesized value of a relative angle between the adjacent joints.

Figure 5:
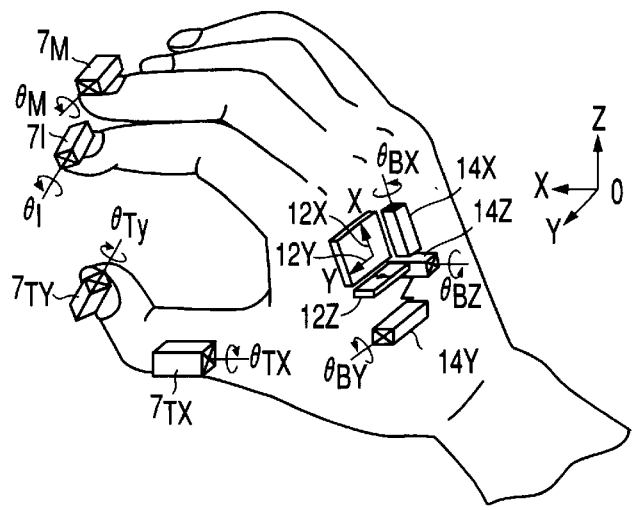
FIG. 5 is a diagram showing that an angular speed sensor is attached to the operator's right hand.

FIG. 5 is a diagram showing that an angular speed sensor is attached to the operator's right hand. As shown in FIG. 5, uniaxial angular speed sensors 7I, 7M, 7TY, 7TX for detecting angle information around the Y-axis (pitch direction) of the fingertip coordinate system XYZ as fingertip posture information are disposed in a forefinger end, middle finger end, and thumb end and middle portion, respectively. Moreover, acceleration sensors 12X, 12Y, 12Z and angular speed sensors 14X, 14Y, 14Z for detecting right hand back positions (Xb, Yb, Zb) and postures (pitch, roll, yaw) are disposed on the back of the right hand.

The acceleration sensors 12X, 12Y, 12Z are constituted of semiconductor acceleration sensors, and here the biaxial acceleration sensors 12X, 12Y and uniaxial acceleration sensor 12Z are combined and constituted. Moreover, a vibration gyro sensor for detecting an angular speed momentum of a uniaxial rotation direction is used as the angular speed sensors 14X, 14Y, 14Z.

According to the constitution, since the information concerning the hand back position and posture and finger posture can be obtained, the shape of the operator's right hand can be estimated.

However, the constitution shown in FIG. 5 has the aforementioned various problems. A constitution for solving the aforementioned conventional problems will be described hereinafter.

Figure 13:
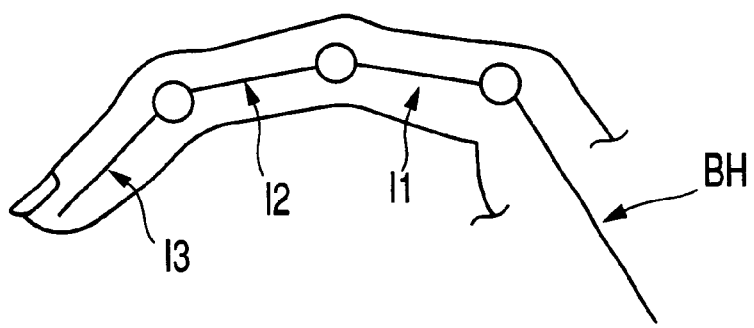
FIG. 13 is a diagram showing a state of each link portion of an operator's forefinger.

In a movement by which the operator naturally grips, or spreads out the gripped hand, the respective joints of the respective fingers naturally bend and spread. In this case, bending and spreading degrees of the respective finger joints are associated with one another. FIG. 13 shows the hand back BH, first link portion I1, second link portion I2, and third link portion I3 in the operator's forefinger. In this case, the rotation angle of each link portion to the hand back BH, and the rotation angle between the link portions are defined as follows. That is, in FIG. 14, an angle between the hand back (BH) and third link portion I3 is defined as I__B3, the angle between the hand back (BH) and second link portion I2 is defined as I__B2, and the angle between the hand back (BH) and first link portion I1 is defined as I__B1. Furthermore, the angle between the second link portion I2 and third link portion I3 is defined as I__23, and the angle between the first link portion I1 and second link portion I2 is defined as I__12.

Relations between the rotation angles of the respective link portions and the respective finger joint angles (θIj1, θIj2, θIj3) are represented as follows.

$$\theta Ij1 = I\_B1$$

$$\theta Ij2 = I\_12$$

$$\theta Ij3 = I\_23 \quad (5)$$

The rotation angles of the respective link portions are closely related with the respective finger joint angles.

Figure 14:
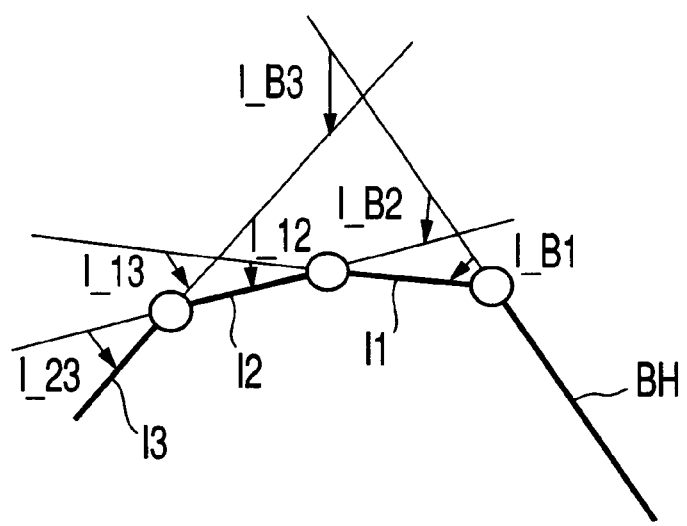
FIG. 14 is a diagram defining rotation angles of each link portion to a hand back BH, and rotation angles between the link portions.

Moreover, as shown in FIG. 14, the following relations are defined.

$$I\_B3 = I\_B1 + I\_12 + I\_23 \quad (6)$$

$$I\_B2 = I\_B1 + I\_12 \quad (7)$$

(Here I__12=I__B2−I__B1)

$$I\_13 = I\_12 + I\_23 \quad (8)$$

(Here I__23=f(I__12), and f is a function determined by a graph 3 of FIG. 17 described later.)

(First Embodiment)

In a first embodiment, in at least one finger of the operator's hand, posture sensors are attached to all of first, second and third link portions to detect posture information of the respective link portions.

Figure 6:
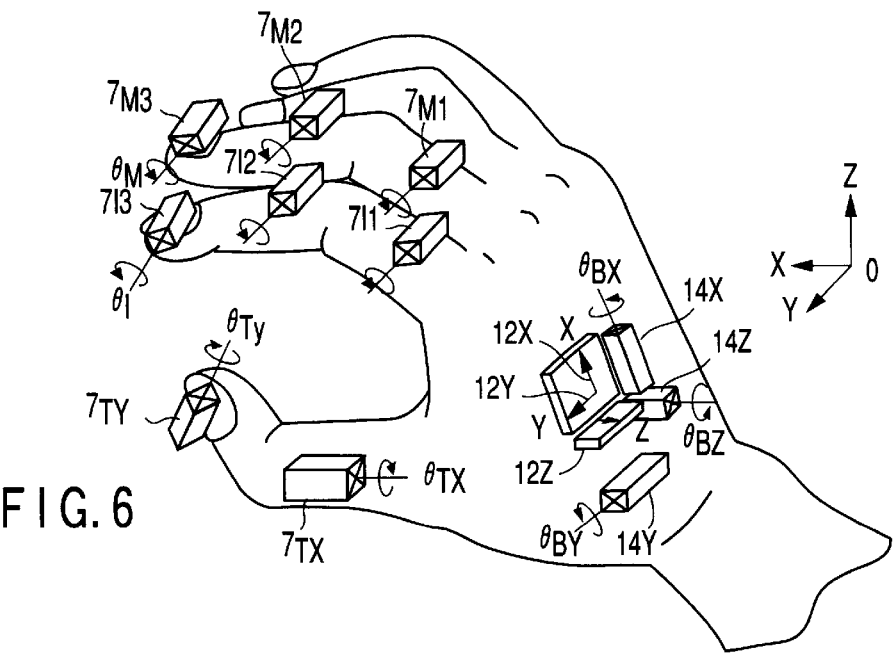
FIG. 6 is a diagram showing one example of a constitution of an operation input apparatus according to a first embodiment of the present invention.

FIG. 6 shows one example of a constitution of an operation input apparatus according to the first embodiment. As shown in FIG. 6, a uniaxial angular speed sensor 7I1 is attached to the first link portion I1 of the operator's right hand forefinger, a uniaxial angular speed sensor 7I2 is attached to the second link portion I2, and a uniaxial angular speed sensor 7I3 is attached to the third link portion I3. Moreover, a uniaxial angular speed sensor 7M1 is attached to the first link portion M1 of the middle finger, a uniaxial angular speed sensor 7M2 is attached to the second link portion M2, and a uniaxial angular speed sensor 7M3 is attached to the third link portion M3. The uniaxial angular speed sensors 7I1, 7I2, 7I3, 7M1, 7M2, 7M3 constitute finger posture detection means.

Furthermore, the acceleration sensors 12X, 12Y, 12Z and angular speed sensors 14X, 14Y, 14Z as hand back detection means are disposed on the back of the right hand. Additionally, the uniaxial angular speed sensors 7TY, 7TX are disposed on the thumb end and middle portion, respectively.

According to the first embodiment, the posture sensors are attached to all the finger link portions. The shape and gesture of the hand are inputted on the condition that the back of the hand is not moved. In this definition, a finger shape can be accurately measured from the relative relation of the posture sensor only of the fingertip.

(Second Embodiment)

Figure 15:
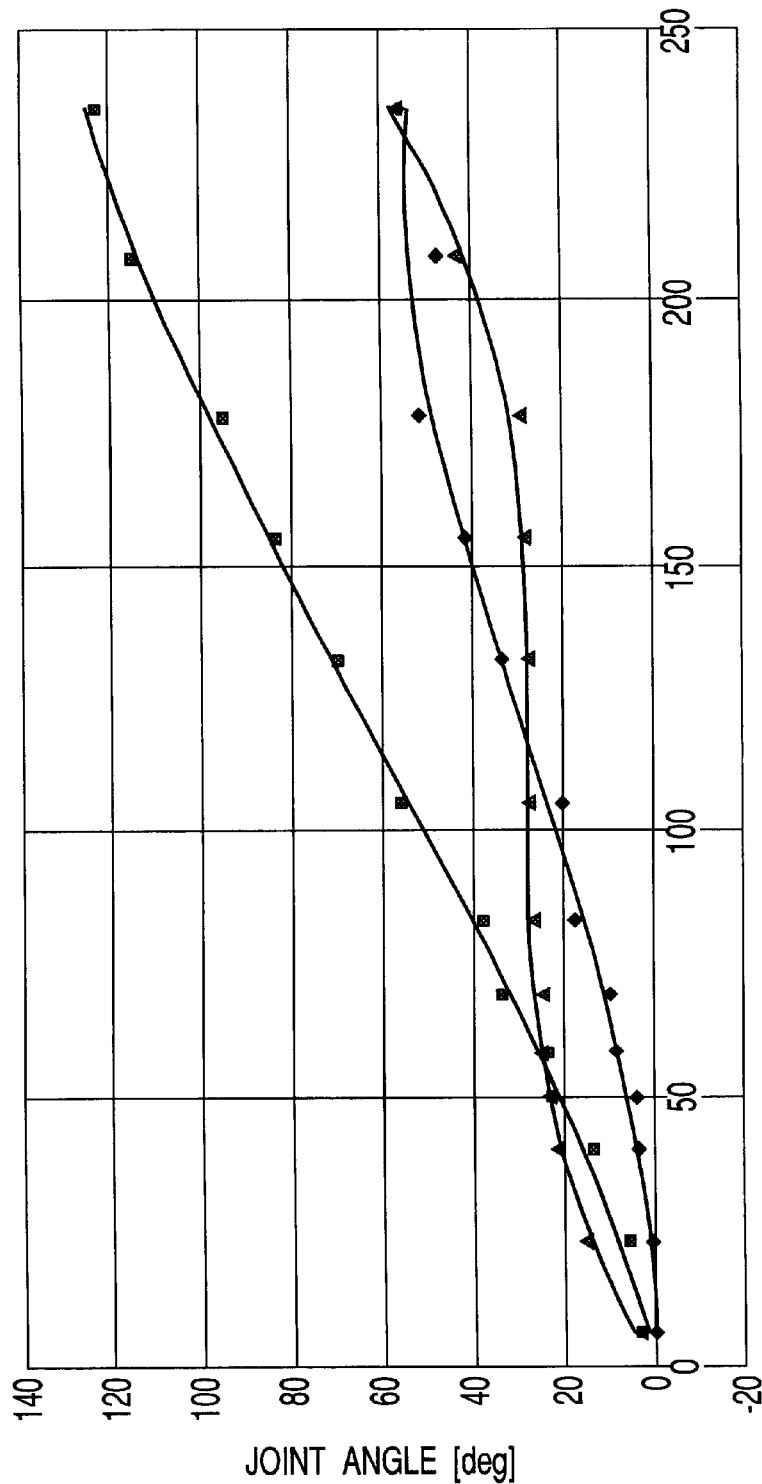
FIG. 15 is a joint angle estimation graph for a fingertip rotation angle.

A second embodiment of the present invention will be described hereinafter. The graph 1 of FIG. 15 is a joint angle estimation graph for a fingertip rotation angle, and the angle I_B3 between the hand back BH and the third link portion I3 of forefinger is plotted on the abscissa. The graph shows changes of the angle I_23 between the second link portion I2 and the third link portion I3, angle I_12 between the first link portion I1 and the second link portion I2, and angle I_B1 between the hand back BH and the first link portion I1, when the angle I_B3 is changed by opening and gripping the hand.

Figure 16:
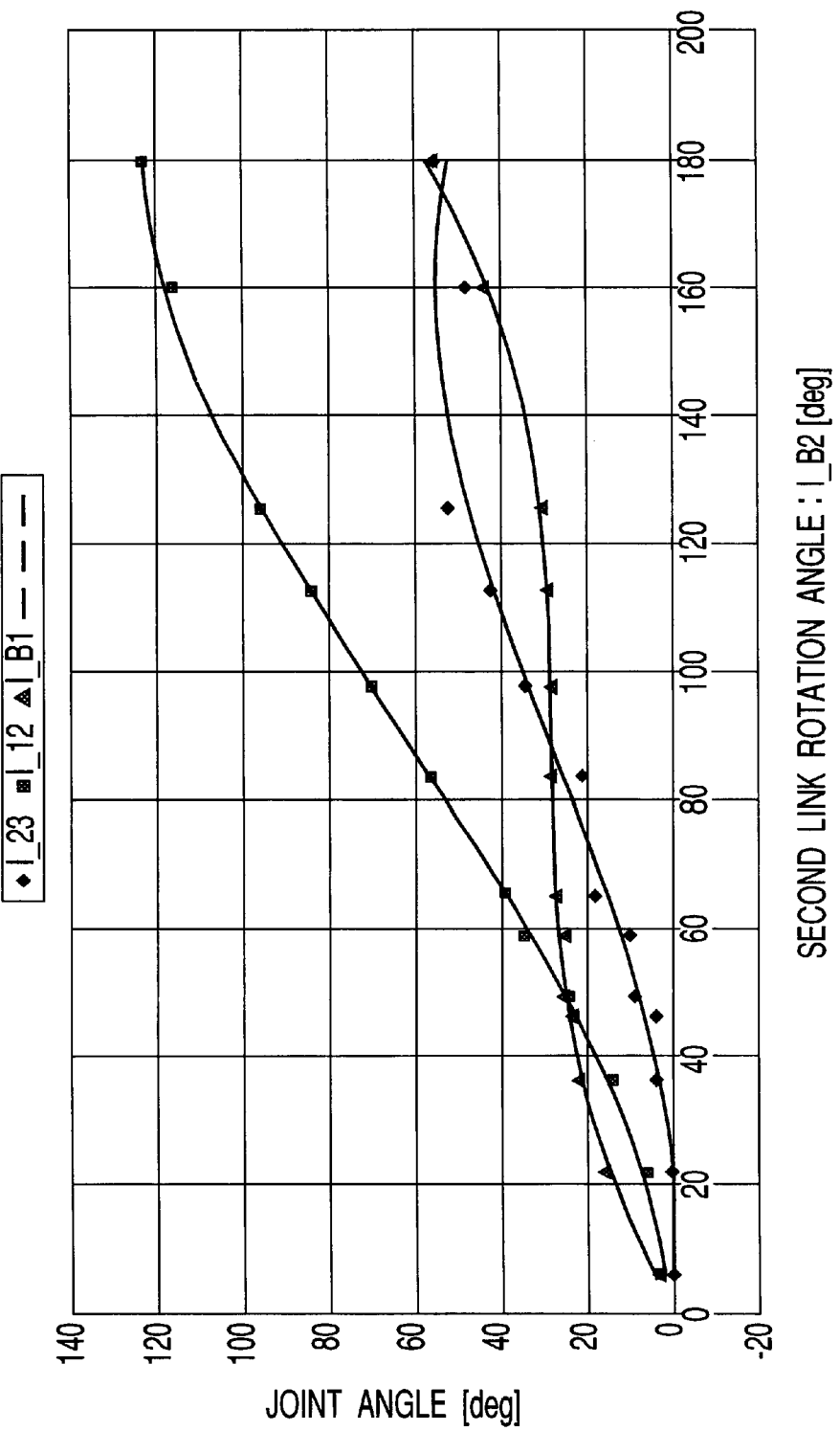
FIG. 16 is a joint angle estimation graph for a second link rotation angle.

Moreover, the graph 2 of FIG. 16 is a joint angle estimation graph for the rotation angle of the second link portion, and the angle I_B2 between the hand back BH and the second link portion I2 is plotted on the abscissa. The graph shows changes of the angle I_23 between the second link portion I2 and the third link portion I3, angle I_12 between the first link portion I1 and the second link portion I2, and angle I_B1 between the hand back BH and the first link portion I1, when the angle I_B2 is changed by opening and gripping the hand.

Figure 17:
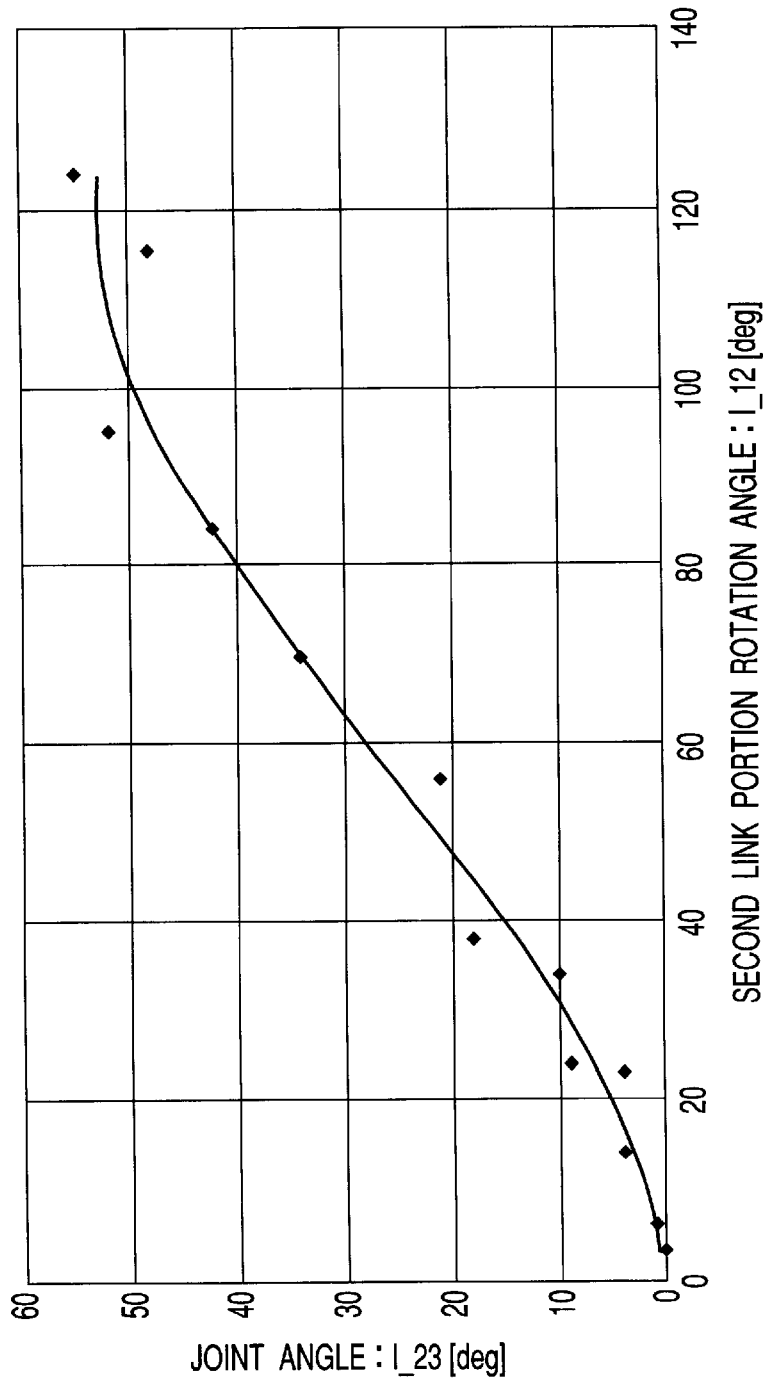
FIG. 17 is a joint angle estimation graph for a second link portion rotation angle.

Furthermore, the graph 3 of FIG. 17 is a joint angle estimation graph of the second link portion I2 to the rotation angle, and shows the relationship between the angle I_23 between the second link portion I2 and the third link portion I3 to the angle I_12 between the first link portion I1 and the second link portion I2.

As is apparent from graphs 1 to 3, the degree of bending of the respective finger joints are mutually associated. Therefore, when the bend degree of one joint is known, the bend degree of another joint can be estimated. For example, a change state of the angle of the second link portion I2 is substantially the same as that of the angle of the third link portions I3, and only the inclination slightly differs. Therefore, the posture sensor does not have to be attached to all the link portions to detect the finger posture. Even in a constitution in which the posture sensor is attached to only one or two link portions among the three link portions, it is possible to estimate the finger shape.

Furthermore, the graphs 1 to 3 will be reviewed in detail. With the natural opening/bending of the finger, the change of posture of the third link portion I3 is largest, and is followed by the change of posture of the second link portion I2 and then that of the first link portion I1. Therefore, the attachment of the posture sensor to the third link portion I3 results in a best detection precision, that of the posture sensor to the second link portion I2 results in a second best detection precision, and that of the posture sensor to the first link portion I1 results in a worst detection precision. For the third link portion I3, the detection precision is satisfactory, but the length of wire increases, and a wire is an obstruction.

Therefore, in the second embodiment, when subtle posture detection is not required, the posture sensor is attached to only the first link portion I1 or only the second link portion I2 in at least one finger of the operator's hand, and the posture sensor is not attached to the third link portion I3. The angle of the first or second link portion of the finger based on the hand back is detected, and each finger joint angle is estimated from the angle of the link portion.

Figure 7:
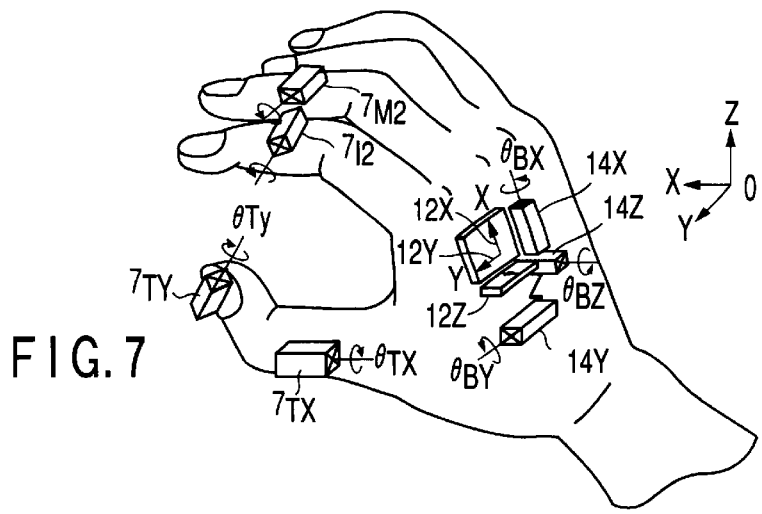
FIG. 7 is a diagram showing one example of the constitution of the operation input apparatus according to a second embodiment of the present invention.

FIG. 7 is a diagram showing one example of the constitution of the operation input apparatus according to the second embodiment. As shown in FIG. 7, as the finger posture detection means, the uniaxial angular speed sensor 7I2 is attached to the second link portion I2 of the operator's right hand forefinger, and the uniaxial angular speed sensor 7M2 is attached to the second link portion M2 of the middle finger.

Figure 8:
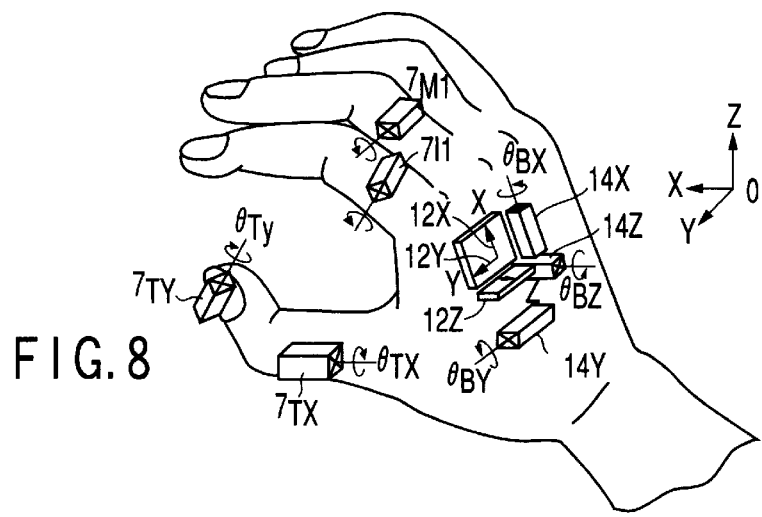
FIG. 8 is a diagram showing another example of the constitution of the operation input apparatus according to the second embodiment of the present invention.

FIG. 8 is a diagram showing another example of the constitution of the operation input apparatus according to the second embodiment. As shown in FIG. 8, as the finger posture detection means, the uniaxial angular speed sensor 7I1 is attached to the first link portion I1 of the operator's right hand forefinger, and the uniaxial angular speed sensor 7M1 is attached to the first link portion M1 of the middle finger.

In FIG. 7 and FIG. 8, the sensors attached to the thumb and hand back portion are similar to those of FIG. 6 and a description thereof is omitted.

According to the second embodiment, a wire or another connection member for connecting the back of the hand to a fingertip sensor can be shortened, one posture sensor may be used, and cost and convenience in use are advantageous.

Additionally, when the constitution of the second embodiment is employed, as is apparent from graph 1, while the angle I_B3 is of the order of 50 [deg] to 200 [deg], the angle I_B1 between the hand back and the first link portion changes little, and it is sometimes difficult to estimate another joint bend. However, this constitution is sufficient for recognizing the open or gripped state of the hand, and sufficiently practical to satisfy most applications. That is, it is preferable to appropriately select a position and number of sensors attached to the finger in accordance with the precision required by the application.

(Third Embodiment)

A third embodiment of the present invention will be described hereinafter. In consideration of movement other than the natural finger opening/bending, usually, when a person tries to bend the finger joint between the second link portion and the third link portion, the joint between the first link portion and the second link portion inevitably moves. That is, the third link portion is connected to the second link portion and the portions can only be integrally moved.

Therefore, in the third embodiment, the posture sensor is attached to the first link portion of at least one finger of the operator's hand, the posture sensor is also attached to either the second link portion or the third link portion of the finger, and the postures are simultaneously measured.

In greater detail, when the posture of the first link portion is measured, a first joint angle is obtained by the relative posture of the hand back. Therefore, when the joint angle from the first link portion can be obtained, the finger shape is known. Therefore, the relation between the second joint portion and the third joint portion is obtained from the relation between the first link portion and the second or third link portion in the graph of FIG. 17. That is, when either a third joint angle or a fingertip angle (the sum of the second and third joint angles) of the first link portion is obtained from the second joint angle, an accurate finger shape can be obtained.

Very roughly, the third joint angle×0.42 may nearly equal the second joint angle. Moreover, to more accurately obtain the finger shape, the relation of graph 3 of FIG. 17 can be obtained by utilizing an equation approximated by a polynomial or the like, or tabling data.

Figure 9:
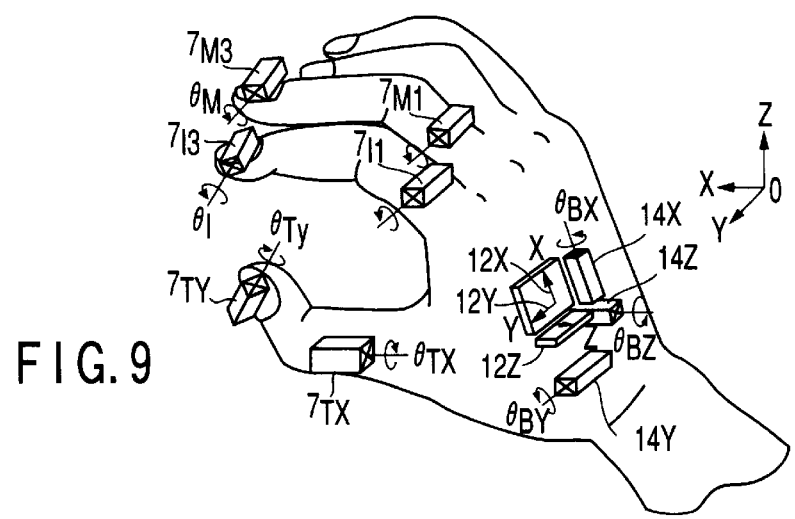
FIG. 9 is a diagram showing one example of the constitution of the operation input apparatus according to a third embodiment of the present invention.

FIG. 9 shows one example of the constitution of the operation input apparatus according to the third embodiment. In FIG. 9, as finger posture detection means, the uniaxial angular speed sensor 7I1 is attached to the first link portion I1 of the operator's right hand forefinger, and the uniaxial angular speed sensor 7I3 is attached to the third link portion I3. Additionally, the uniaxial angular speed sensor 7M1 is attached to the first link portion M1 of the right hand middle finger, and the uniaxial angular speed sensor 7M3 is attached to the third link portion M3.

Figure 10:
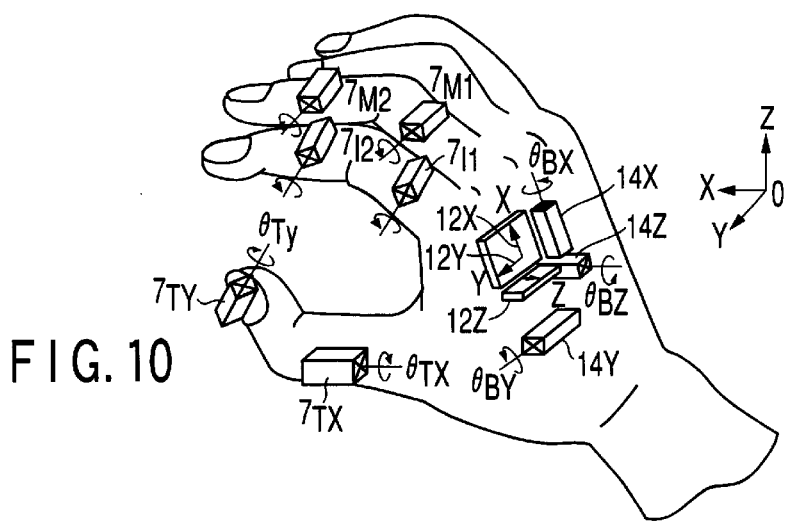
FIG. 10 is a diagram showing another example of the constitution of the operation input apparatus according to the third embodiment of the present invention.

FIG. 10 shows another example of the constitution of the operation input apparatus according to the third embodiment. In FIG. 10, as the finger posture detection means, the uniaxial angular speed sensor 7I1 is attached to the first link portion I1 of the operator's right hand forefinger, and the uniaxial angular speed sensor 7I2 is attached to the second link portion I2. Additionally, the uniaxial angular speed sensor 7M1 is attached to the first link portion M1 of the right hand middle finger, and the uniaxial angular speed sensor 7M2 is attached to the second link portion M2.

In FIG. 9 and FIG. 10, since the sensors attached to the thumb and hand back portion are similar to those of FIG. 6, a description thereof is omitted.

In the conventional art, a locus of a movement point of a fingertip can be drawn only as one curve which indicates a natural hand open/close movement tabled beforehand. However, according to the method of the third embodiment, the movements of the first and second joints of the finger can be separately measured. Therefore, it is possible to measure two-dimensional movements only by the fingertip such as a back and forth movement for sticking the fingertip and a movement for drawing a circle with the fingertip.

As described above, according to the third embodiment, even when the number of attached sensors is reduced, an accurate finger shape can be estimated.

(Fourth Embodiment)

A fourth embodiment of the present invention will be described hereinafter. In the fourth embodiment, the posture sensors disposed along two axes different in direction from each other are used to detect the finger posture, and a movement for bending the finger, a movement for spreading out fingers to make a scissors gesture, and the like are detected.

Figure 11:
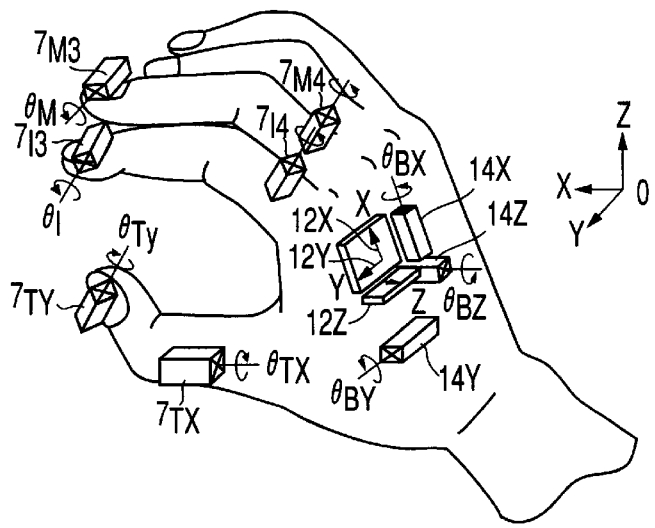
FIG. 11 is a diagram showing one example of the constitution of the operation input apparatus according to a fourth embodiment of the present invention.

FIG. 11 shows one example of the constitution of the operation input apparatus according to the fourth embodiment. As the finger posture detection means, the uniaxial angular speed sensor 7I3 is attached to the third link portion I3 of the operator's right hand forefinger, and a uniaxial angular speed sensor 7I4 different in direction from the uniaxial angular speed sensor 7I3 is attached to the first link portion I1. Additionally, the uniaxial angular speed sensor 7M3 is attached to the third link portion M3 of the right hand middle finger, and a uniaxial angular speed sensor 7M4 different in direction from the uniaxial angular speed sensor 7M3 is attached to the first link portion M1.

In FIG. 11, since the sensors attached to the thumb and hand back portion are similar to those of FIG. 6, the description thereof is omitted.

By this constitution, a relative value of each finger open direction is obtained based on the angular speed of the middle finger, and a finger horizontal open/close movement (fingers scissors gesture) is detected.

Moreover, when each fingertip bend state (angle around the Y-axis) is matched, rotation information of the wrist around the Z-axis is similarly added to the sensors 7I4 and 7M4, and the rotation amount of the wrist can be corrected. However, when each fit bend state is not matched, the condition collapses. Therefore, added is a condition that a relative value in a fingertip matched state is constantly detected by a fingertip Y-axis rotation sensor. Since a general scissors movement is frequently performed in a fingertip extended state, there is no problem with the added condition.

According to the fourth embodiment, it is possible to detect a complicated finger shape, for example, the horizontal open/close movement of the finger (fingers scissors gesture).

(Fifth Embodiment)

A fifth embodiment will be described hereinafter. In the fifth embodiment, a first posture sensor is attached to the finger of the operator's hand, a second posture sensor is attached to the back of the hand, and a third sensor for detecting the movement or the posture is attached to the operator's wrist. A wrist joint for connecting a front arm to the back of the hand can substantially be handled as a model with a degree of freedom of 1 in a Y-axis rotation. In this case, a wrist sensor portion of the third sensor is attached among Wjy, Wjz and Wjx of a wrist joint model (FIG. 3). Then, the rotation angles of the hand back and fingertip with respect to the rotation of the wrist around Y-axis is utilized based on the wrist posture to detect the finger shape.

Figure 12:
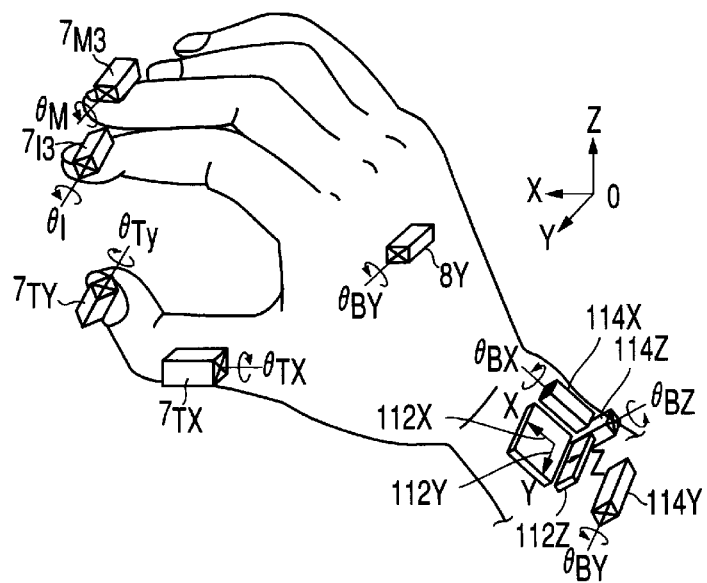
FIG. 12 is a diagram showing one example of the constitution of the operation input apparatus according to a fifth embodiment of the present invention.

FIG. 12 shows one example of the constitution of the operation input apparatus according to the fifth embodiment. As the finger posture detection means, the uniaxial angular speed sensor 7I3 is attached to the third link portion I3 of the operator's right hand forefinger, and the uniaxial angular speed sensor 7M3 is attached to the third link portion M3 of the middle finger. Additionally, acceleration sensors 112X, 112Y, 112Z and angular speed sensors 114X, 114Y, 114Z for detecting positions (Xb, Yb, Zb) and posture (pitch, roll, yaw) are attached to the right wrist.

According to the fifth embodiment, the sensor needed to be attached to the hand back portion can be reduced, and a main constituting component is attached to the wrist. Therefore, the sensor can be easily attached to the wrist with the same feeling as that in attaching a wrist watch.

Additionally, in addition to the respective constitutions of the aforementioned first to fifth embodiments, hand shape estimation means and operation input analysis means disclosed in Jpn. Pat. Appln. No. 302236/1998 by the present applicant can be used to accurately estimate or measure the hand shape.

In the embodiments, the three fingers model of thumb and two other fingers has been described above, but the embodiments are not limited to this example. A combination of the thumb with one to four other fingers can be used. Moreover, the respective embodiments may be combined for the respective fingers. Furthermore, the respective embodiments can also be applied to not only one hand but also both hands.

According to the aforementioned embodiments, the finger sensor can be accurately measured. Moreover, a member for connecting the hand back to the finger sensor can be shortened, only one sensor may be attached to a finger, and the constitution is advantageous in respect of cost and convenience in use. Furthermore, the number of sensors to be attached is reduced, and the finger shape can be accurately obtained. Furthermore, a complicated finger shape, for example, the "scissors" movement can be detected. Additionally, the number of sensors needed to be attached to the hand back portion can be reduced, and the sensors can be easily attached.

(Additional Note)

The invention with the following constitution can be extracted from the aforementioned first to fifth embodiments.

1. An operation input apparatus comprising:

hand back detection means, attached to a back of a hand of an operator, for detecting a movement or a posture of the operator's hand back;

finger posture detection means, attached to a finger of the operator, for detecting the posture of the operator's finger;

hand shape estimation means for obtaining a shape of the whole hand of the operator based on an output of the hand back detection means and the output of the finger posture detection means; and operation input analysis means for using the output of the hand shape estimation means to generate a command in a predetermined system, wherein the finger posture detection means comprises a posture sensor, and the posture sensor is attached to all of a first link portion, a second link portion, and a third link portion in at least one finger of the hand.

(Effect)

The hand shape can be accurately measured.

2. An operation input apparatus comprising:

hand back detection means, attached to a back of a hand of an operator, for detecting a movement or a posture of the operator's hand back;

finger posture detection means, attached to a finger of the operator, for detecting the posture of the operator's finger;

hand shape estimation means for obtaining a shape of the whole hand of the operator based on an output of the hand back detection means and the output of the finger posture detection means; and operation input analysis means for using the output of the hand shape estimation means to generate a command in a predetermined system, wherein the finger posture detection means comprises a posture sensor, and the posture sensor is attached to at least one of a first link portion, and a second link portion of at least one finger, and is not attached to a third link portion of the finger.

(Effect)

A wire or another connection member can be shortened, one sensor may be attached, and the apparatus is advantageous in cost and convenience in use.

3. An operation input apparatus comprising:

hand back detection means, attached to a back of a hand of an operator, for detecting a movement or a posture of the operator's hand back;

finger posture detection means, attached to a finger of the operator, for detecting the posture of the operator's finger;

hand shape estimation means for obtaining a shape of the whole hand of the operator based on an output of the hand back detection means and the output of the finger posture detection means; and operation input analysis means for using the output of the hand shape estimation means to generate a command in a predetermined system, wherein the finger posture detection means comprises a posture sensor, and the posture sensor is attached to at least one of a second link portion and a third link portion of at least one finger, and is attached to a first link portion of the finger.

(Effect)

The number of attached sensors can be reduced and the hand shape can be accurately obtained.

4. An operation input apparatus comprising:

hand back detection means, attached to a back of a hand of an operator, for detecting a movement or a posture of the operator's hand back;

finger posture detection means, attached to a finger of the operator, for detecting the posture of the operator's finger;

hand shape estimation means for obtaining a shape of the whole hand of the operator based on an output of the hand back detection means and the output of the finger posture detection means; and operation input analysis means for using the output of the hand shape estimation means to generate a command in a predetermined system, wherein the finger posture detection means comprises a posture sensor, the posture sensor detects the posture in two axes different in direction from each other, and the operation input apparatus detects a movement for bending the finger and a movement for spreading out the finger based on the output of the posture sensor.

(Effect)

A more complicated hand shape, for example, in the scissors gesture can be detected.

5. An operation input apparatus comprising:

wrist detection means, attached to a wrist of an operator, for detecting a movement or a posture of the operator's wrist;

hand back detection means, attached to a back of a hand of the operator, for detecting the posture of the operator's hand back;

finger posture detection means, attached to a finger of the operator, for detecting the posture of the operator's finger;

hand shape estimation means for obtaining a shape of the whole hand of the operator based on an output of the wrist detection means, the output of the hand back detection means and the output of the finger posture detection means; and operation input analysis means for using the output of the hand shape estimation means to generate a command in a predetermined system.

(Effect)

The sensors needed to be attached to the hand back portion can be reduced, and can be easily attached.

(Sixth Embodiment)

An outline of a sixth embodiment of the present invention will next be described. A hand back sensor including a triaxial acceleration sensor and triaxial angular speed sensor is attached to detect the position, posture and movement of the operator's hand. Therefore, a rotation movement and translatory movement of the hand back can be obtained by information obtained from the acceleration sensor and angular speed sensor.

However, since gravity acceleration by a gravitational force and inertia acceleration by an inertia movement are synthesized in the acceleration sensor, an inclination component as the gravity acceleration is separated by a low-pass filter, angle information obtained by integrating the angular speed of the angular speed sensor with time, and the like. For acceleration information by the inertial movement obtained in this manner and outputted from the acceleration sensor, when acceleration movement is eliminated, even with a constant-speed movement or a stop, inertial acceleration becomes zero, and an movement state cannot be distinguished.

To solve the problem, in the sixth embodiment, in addition to the hand back sensor for detecting the position and posture of the hand back, an image space sensor able to detect movement information in a direction of two axes crossing at right angles to each other is disposed, and an image of the environment of a person with the sensor attached thereto is picked up. A relative movement of an image sensor to a peripheral object can be known from the movement of the image inputted to the image space sensor. An image signal obtained from the image space sensor includes movement change information indicating presence/absence of the movement and movement direction information indicating the direction of the movement. Here, a movement change amount in the directions crossing at right angles to each other on the image is detected based on a change of a characteristic point between front and back frames of the environment image inputted to the image space sensor in time series utilizing the aforementioned fact. Here, a focus distance of the image space sensor is substantially set at infinity. When the movement information obtained from the image space sensor is combined with the information from the acceleration sensor and angular speed sensor, the translatory movement of the hand back can be accurately obtained.

Figure 18:
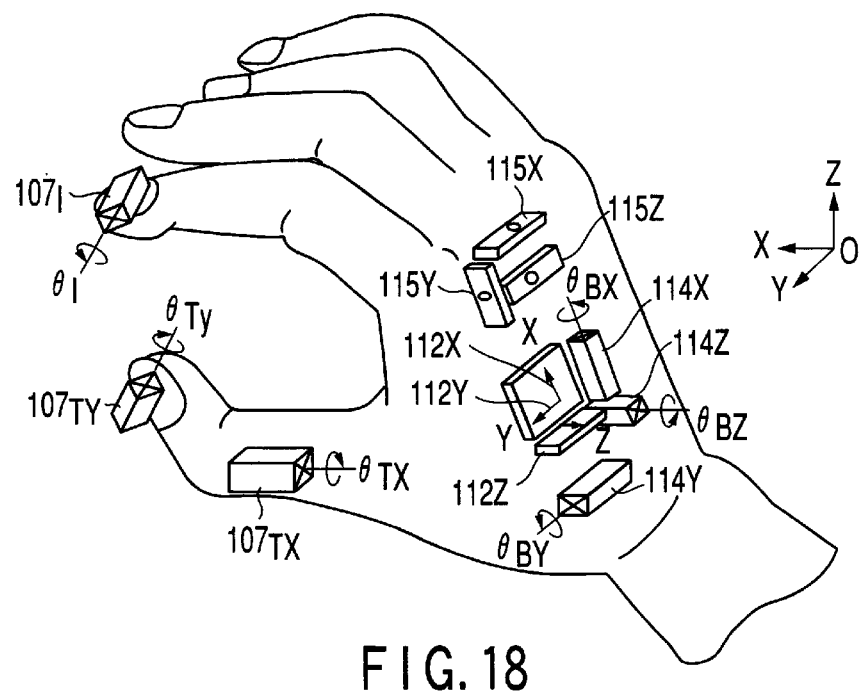
FIG. 18 is a diagram showing an example of a constitution of an operation input apparatus in which image processing chips 115X, 115Y, 115Z with an image space sensor mounted thereon are disposed.

The sixth embodiment of the present invention will be described hereinafter in detail with reference to the drawings. FIG. 18 is a diagram showing a constitution example of an operation input apparatus in which an image processing chip with the image space sensor mounted thereon is disposed.

In addition to the image space sensor for taking the image, the image processing chip is provided with comparison means for comparing the images taken at different time points with one another, and acquirement means for obtaining image movement information based on a comparison result of the comparison means. Moreover, for example, HDNS-2000 manufactured by Hewlett-Pacard (HP) Co., Ltd. can be used as the image processing chip. The image processing chip is a chip exclusively for short distance image pickup, but it is easy to attach an optical adapter for long distance image pickup to the chip, or to improve a logic circuit and apply the chip to long-distance image pickup.

As shown in FIG. 18, as finger posture detection means for detecting the angle information around the Y-axis (pitch direction) of a fingertip coordinate system XYZ, uniaxial angular speed sensors 107I, 107TY, 107TX are disposed in a right hand forefinger end, and thumb end and middle portion, respectively. Moreover, as hand back detection means for detecting right hand back positions (Xb, Yb, Zb) and postures (pitch, roll, yaw), acceleration sensors 112X, 112Y, 112Z and angular speed sensors 114X, 114Y, 114Z are disposed on the back of the right hand.

Here, the acceleration sensors 112X, 112Y, 112Z are constituted of semiconductor acceleration sensors, and here the biaxial acceleration sensors 112X, 112Y and uniaxial acceleration sensor 112Z are combined and constituted. Moreover, a piezoelectric vibrating gyro sensor for detecting an angular speed momentum of a uniaxial rotation direction is used as the angular speed sensors 114X, 114Y, 114Z.

Furthermore, image processing chips 115X, 115Y, 115Z are disposed adjacent to the acceleration sensors 112X, 112Y, 112Z and angular speed sensors 114X, 114Y, 114Z in the right hand back, and along three hand back space coordinate axes X, Y, Z substantially crossing at right angles to one another.

Figure 19:
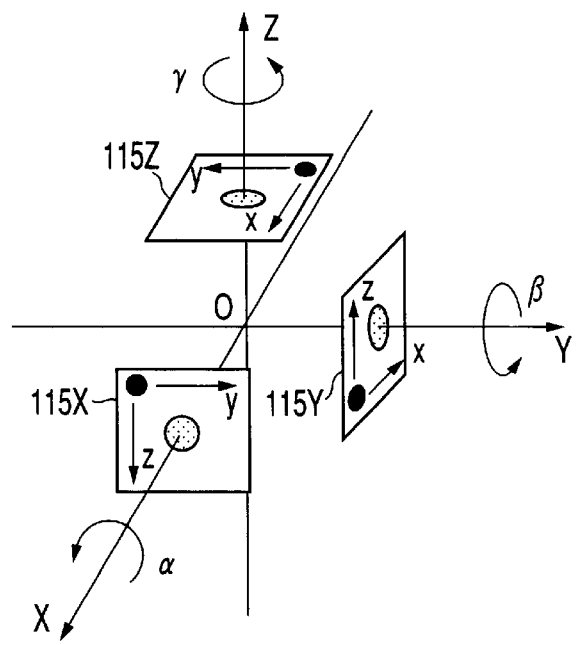
FIG. 19 is a diagram showing the image processing chips 115X, 115Y, 115Z disposed along respective attachment axes X, Y, Z and detection directions of the chips.

FIG. 19 shows the image processing chips 115X, 115Y, 115Z disposed along the respective attachment axes X, Y, Z and detection directions of the chips. For an output signal from a single unit of an image processing chip, a displacement in a horizontal/vertical direction with a black circle position seen in a left upper corner is outputted as image translatory movement information Ix, Iy. Correspondence in an output coordinate axis direction is shown in an attachment state in triaxial spacial directions as in FIG. 19. The image processing chip 115X obtains movement information in y and z directions.

Figures 20, 21:
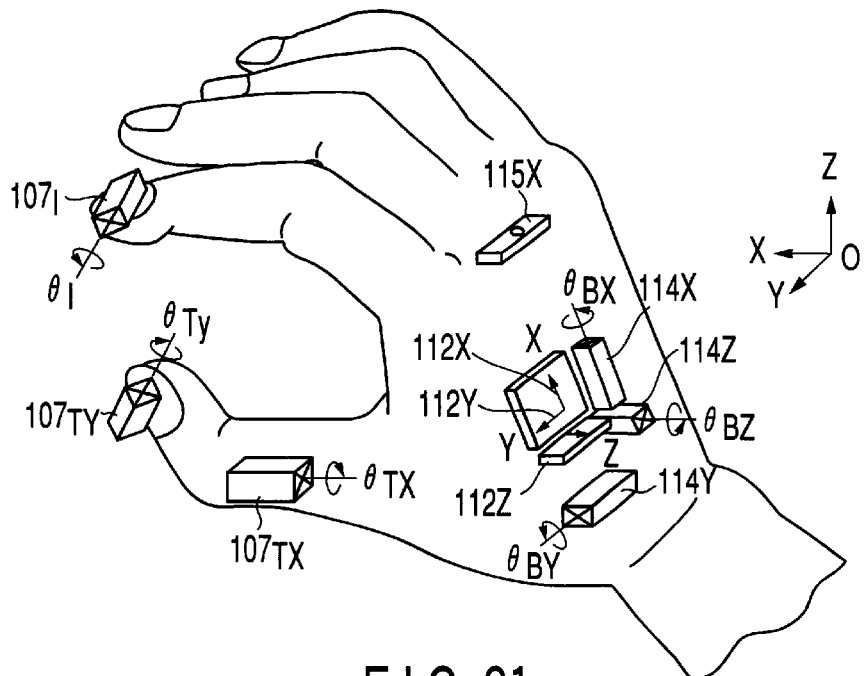
FIG. 20 is a diagram showing a combination of movement detection information from the image processing chips 115X, 115Y, 115Z concerning a translatory movement and rotary movement of the back of the hand.
FIG. 21 is a diagram showing another example of a constitution of the operation input apparatus in which the image processing chip with the image space sensor mounted thereon is disposed in a sixth embodiment of the present invention.

Moreover, the image processing chip 115Y obtains movement information in x and y directions. Furthermore, the image processing chip 115Z obtains movement information in x and y directions. In this arrangement of the image processing chip, when the hand back separately moves in +X, +Y and +Z directions in a translatory manner, a combination of movement detection information is obtained from the respective image processing chips 115X, 115Y, 115Z as shown in FIG. 20. Moreover, when the hand back rotates by +α centering on the X-axis, by +β centering on the Y-axis or by +γ centering on the Z-axis, the movement detection joint portion with a combination of the output coordinate axis directions can be obtained from the respective image processing chips 115X, 115Y, 115Z as shown in FIG. 20. When the image processing chip is disposed along the triaxial direction, six axes posture information of the hand back can be obtained only with image processing.

Furthermore, it can be judged based on the movement detection information whether the hand back is in a constant acceleration state or in a stop state. When the movement detection information is combined with the aforementioned output information of the angular speed sensor and acceleration sensor, the hand back posture can be accurately obtained.

FIG. 21 is a diagram showing a modification example of the constitution shown in FIG. 18. In the example, only one image processing chip (115X is shown in FIG. 21) is disposed on the hand back. When a predetermined operation mode such as a pointing mode is obtained by a hand gesture, the image processing chip is used to obtain translatory information with the translatory movement of the hand back in the operation mode. For example, in a virtual mouse mode, the translatory movement is performed without performing any rotation movement. Therefore, it is judged that the hand back performs only the translatory movement in the vertical/horizontal direction, and a calculation movement can be performed.

Moreover, when one image processing chip 115Z of FIG. 18 is used, back and forth and horizontal translatory movements can be obtained. A gesture for moving the hand back on a plane such as a desk can be recognized. In this manner, it is assumed that the image processing chip is disposed for the operation mode.

Additionally, detection output information with only one image processing chip is not used in detecting the hand back posture.

FIG. 22 is an explanatory diagram showing the relationship of respective sensor information in the movement detection operation of the operation input apparatus in the sixth embodiment, and the flow of the movement detection operation. This diagram shows a measurement operation routine for measuring, calculating and processing the signal for the movement detection operation, and this routine is periodically repeatedly processed in accordance with an internal timer.

First, when signal detection is started, measurement of an acceleration signal Ah(d) with the hand back movement by the acceleration sensors 112X, 112Y, 112Z, measurement of an angular speed signal Gh(d) for a hand back rotation axis by the angular speed sensors 114X, 114Y, 114Z, measurement of image translatory movement information Ix(d), Iy(d) by the image processing chips 115X, 115Y, 115, and measurement of a fingertip angular speed signal G(i) by uniaxial angular speed sensors 107I, 107TY, 107TX disposed on the respective fingertips are performed in parallel to one another (steps S1, S12, S18, S23). By a number d, three sensors are identified with the X, Y, Z axes in order, and d=1, 2, 3. In fingertip angular speed signal G(i), i denotes a number for identifying the angular speed sensor of each fingertip.

After measuring the acceleration signal Ah(d) in step S1, in step S2 data is compared and processed with the previous signal data of the acceleration sensor itself, and it is judged whether or not there is a change in the output signal. Thereby, it is judged whether the hand back moves, stops, or moves at a constant speed. Moreover, this is judged by judging whether or not an absolute values of a difference of the signals exceeds a threshold value. When there is a change in the output signal for each of each triaxial sensor signal, 0 is written in an acceleration stop flag Astop(d) in step S3. When there is no change of the output signal, 1 is written in the acceleration stop flag Astop(d) in step S4.

Moreover, also after measuring an angular speed signal Gh(d) in step S12, in step S13 the data is compared with the previous signal data, and it is judged whether the change mount is in a predetermined range. When the respective three axes sensor signals are in the predetermined range, it is judged that there is no rotation movement, the flow advances to step S15, and 1 is written in an angular speed stop flag Gstop(d). When the signals are not in the predetermined range, 0 is written in the angular speed stop flag Gstop(d) in step S14.

Moreover, after measuring image translatory movement in step S18, the flow advances to step S19. It is judged whether or not the outputs of the image processing chips 115X, 115Y, 115Z are displaced. Thereby, it is judged whether there is relative movement between the hand back and the peripheral image. When the signal is not displaced for the respective three axes, the flow advances to step S21 to write 1 in an image stop flag Istop(d). Moreover, when the signal is displaced, the flow advances to step S20 to write 0 in the image stop flag Istop(d).

In step S16, moving averages of an angular speed signal measured in the step S12 and the angular speed signal during judgment of stop are obtained as offset signal points. Based on the points, angular speed $\omega(\alpha, \beta, \gamma)$ of the triaxial rotation direction of the hand back is calculated from an offset processing and scale conversion processing.

In step S11, a hand back inclination posture ($\theta x$, $\theta y$) for a gravity vector axis is calculated from acceleration information measured in step S1.

Subsequently, in step S17 a tentative hand back posture $\theta'$ is obtained by integrating the angular speed $\omega(\alpha, \beta, \gamma)$ calculated in step S16 with the previous hand back posture $\theta$. The posture is subjected to a drift correction operation using the inclination posture information ($\theta x$, $\theta y$) calculated in the step S11, and a new hand back angle posture $\theta(\alpha, \beta, \gamma)$ is calculated.

When power is turned on or a reset signal is executed, an initializing operation of internal information is performed as described later. An initial value of an acceleration signal Ah(d) and a square root (G0) of the squared sum of the three axes acceleration signals are retained. The hand back angle posture $\theta(\alpha, \beta, \gamma)$ is initialized as $\alpha=\theta y$, $\beta=\theta x$, and $\gamma=0$ in accordance with the inclination posture information measured/calculated at that time. Moreover, the respective angular speed signals Gh(d) and G(i) are retained as initial offset signals. Each stop judgment flag is also initialized/set to 1. Moreover, in this case, the hand back may be inclined but needs to satisfy stop conditions. However, this is momentary.

In step S5, in order to remove a gravity acceleration component from the acceleration signal measured in step S1, a translatory acceleration component $\alpha(d)$ is extracted based on the angular speed information calculated in step S16 and the sensor signal value (G0) of gravity vector 1G is retained during initialization. Subsequently, in step S6 the movement of the hand back is judged. This movement judgment process will be described later in detail.

In step S22 a process for judging a movement direction from the condition of FIG. 20 is performed based on the image translatory movement information measured in step S18.

Moreover, after start of fingertip angular speed measurement of step S23, the flow advances to step S24. An offset processing and scale conversion processing are performed from a fingertip angular speed signal measured in step S23. Further, from hand back angular speed information $\omega$ calculated in step S16, processing of finger joint angular speed F$\omega$(i) of the fingertip to the hand back is performed, and in the next step S25 a fingertip angle F$\theta$(i) is calculated.

Figure 23:
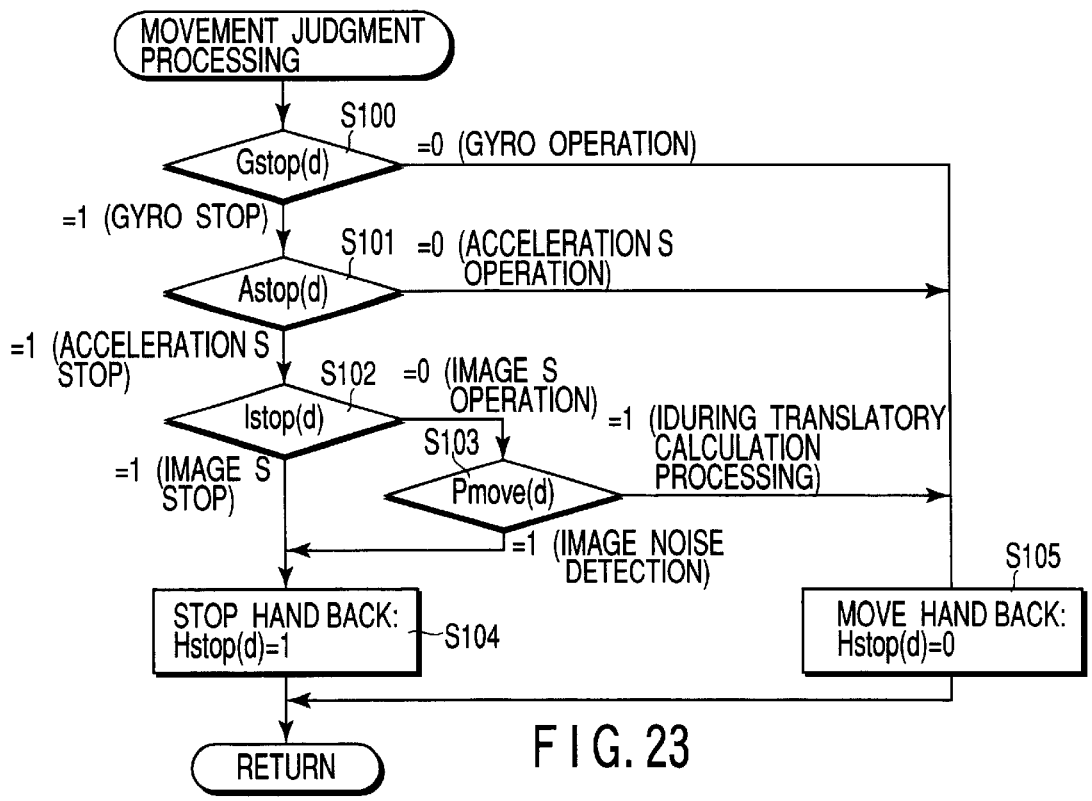
FIG. 23 is a flowchart showing details of movement judgment processing of step S6 of FIG. 22.

The movement judging process of step S6 will be described hereinafter in detail with reference to FIG. 23. First, it is checked in step S100 whether an angular speed stop flag Gstop(d) is 0 or 1. When the flag is 0, there are outputs from gyro sensors as the angular speed sensors 114X, 114Y, 114Z. Therefore, it is judged that the hand back rotates, 0 is written in a hand back stop flag Hstop (step S105), and the flow returns.

Moreover, when all the angular speed stop flags Gstop(d) are 1, the flow advances to step S101 to check whether the acceleration stop flag Astop(d) is 0 or 1.

When any one of the acceleration stop flags Astop(d) is 0, there are displacement outputs from the acceleration sensors 112X, 112Y, 112Z. Therefore, translatory movement of the hand back is judged, 0 is written in the hand back stop flag Hstop (step S105), and the flow returns. Moreover, when the acceleration stop flag Astop(d) is 1, the flow advances to step S102 to check whether the image stop flag Istop(d) is 0 or 1.

When the image stop flag Istop(d) is 0, there is a relative movement between the hand back having the image space sensor and the peripheral image object. Therefore, a translatory calculation flag Pmove(d) is checked to judge whether the hand back moves, or the hand back stops and the peripheral object moves.

When the translatory calculation flag Pmove(d)=1 in step S103, it is judged in the previous measurement calculation routine that the translatory calculation is performed and the hand back moves, 0 is written in the hand back stop flag Hstop (step S105), and the flow returns. In this case, it is estimated that the hand back does not rotate, and the translatory movement of the hand back is in a constant speed state.

Moreover, when the translatory calculation flag Pmove (d)=0 in step S103, no translatory calculation is performed in the previous measurement calculation routine and there is no constant-speed translatory movement of the hand back. It is judged that there is an image noise generated from movement of the peripheral object and that the hand back stops, 1 is written in the hand back stop flag Nstop (step S106), and the flow returns.

Moreover, when the image stop flag Istop(d) is 1 in step S102, there is no translatory movement output from the image space sensor, it is judged that the hand back completely stops, 1 is written in the hand back stop flag Hstop (step S105), and the flow returns.

Here, the flow returns to the processing of FIG. 22. After the movement judgment processing of step S6, it is checked in step S7 whether or not the hand back stop flag Hstop is 0 or 1. when the flag is 1, the flow advances to step S10 to stop the translatory calculation, and write 0 in the translatory movement calculation flag Pmove(d). Calculation for various sensor processings in a complete stop condition is performed, and the flow returns from the measurement calculation routine.

Moreover, when the hand back stop flag Hstop is 0, the flow advances to step S8. In order to start the translatory calculation, 1 is written in the translatory calculation flag Pmove(d). In the next step S9, in consideration of the judgment result of the movement direction in step S22, a translatory acceleration is integrated with time based on the translatory acceleration component α(d) in step S5 and translatory speed v(d) and translatory position information l(d) are obtained.

According to the sixth embodiment, the stop and the constant-speed movement of the operator's hand can be accurately distinguished.

Moreover, in the sixth embodiment, the image sensor information is utilized to correct the calculation processing of the translatory information by the acceleration sensor. However, the information can be similarly utilized in a drift correction process and angle calculation processing of the angular speed sensor.

Additionally, in addition to the constitution of the aforementioned embodiment, hand shape estimation means and operation input analysis means disclosed in Jpn. Pat. Appln. No. 302236/1998 by the present applicant are used to estimate the hand shape.

According to the aforementioned embodiment, there can be provided a movement detection apparatus which can accurately recognize the spacial position, posture and movement of the object. Moreover, there can be provided an operation input apparatus which can accurately recognize the spacial position, posture and movement of the operator's hand.

(Additional Note)

The invention of the following constitution can be extracted from the sixth embodiment.

1. A movement detection apparatus for using at least one of an acceleration sensor and an angular speed sensor to detect the movement of an object, the apparatus comprising:

image pickup means for taking an image of environment;

comparison means for comparing images of different time points taken by the image pickup means with one another; and acquirement means for obtaining movement information of the object based on a comparison result of the comparison means.

(Effect)

There can be provided a movement detection apparatus which can accurately distinguish stop and constant-speed movement of the object.

2. An operation input apparatus comprising:

hand back detection means, attached to a back of an operator's hand, for detecting at least one of an acceleration or an angular speed applied to the hand; and operation input analysis means for utilizing a detection result of the hand back detection means to generate a command in a predetermined system, the operation input apparatus further comprising:

image pickup means for taking an image of an environment;

comparison means for comparing the images of different time points taken by the image pickup means; and acquirement means for obtaining movement information of the hand based on a comparison result of the comparison means.

(Effect)

There can be provided an operation input apparatus which can accurately recognize the spacial position, posture and movement of the operator's hand.

3. An operation input apparatus comprising:

hand back detection means, attached to a back of a hand of an operator, for detecting a movement or a posture of the operator's hand back;

finger posture detection means, attached to a finger of the operator, for detecting the posture of the operator's finger;

hand shape estimation means for obtaining a shape of the whole hand of the operator based on outputs of the hand back detection means and the finger posture detection means; and operation input analysis means for using the output of the hand shape estimation means to generate a predetermined command, the operation input apparatus further comprising:

image pickup means for taking an image of an environment;

comparison means for comparing the images of different time points taken by the image pickup means; and acquirement means for obtaining movement information of the hand based on a comparison result of the comparison means.

(Effect)

There can be provided an operation input apparatus which can accurately recognize the spacial position, posture and movement of the operator's hand.

4. The movement detection apparatus according to paragraph 1. wherein the image pickup means, the comparison means and the acquirement means are realized on one chip.

(Effect)

In addition to the effect of paragraph 1, there can be provided a smaller movement detection apparatus.

5. The operation input apparatus according to paragraph 2. or 3. wherein the image pickup means, the comparison means and the acquirement means are realized on one chip.

(Effect)

There can be provided an operation input apparatus in which the sensor is not bulky.

6. The operation input apparatus according to paragraph 5. wherein the chip is attached to the hand back, and the operation input apparatus has an operation mode for reflecting an output of the chip in the output of the hand back detection means, and an operation mode for reflecting no output of the chip in the output of the hand back detection means.

(Effect)

Only in a predetermined operation in which the stop and the constant-speed movement of the hand back need to be distinguished from each other, the information by image pickup can be utilized, and it is easy to prepare a logic.

7. The operation input apparatus according to paragraph 5. or 6. wherein three chips are attached, and the image of three directions substantially crossing at right angles to one another is taken.

(Effect)

Spacial six-axes information can be obtained only with the image.

(Seventh Embodiment)

Figure 24:
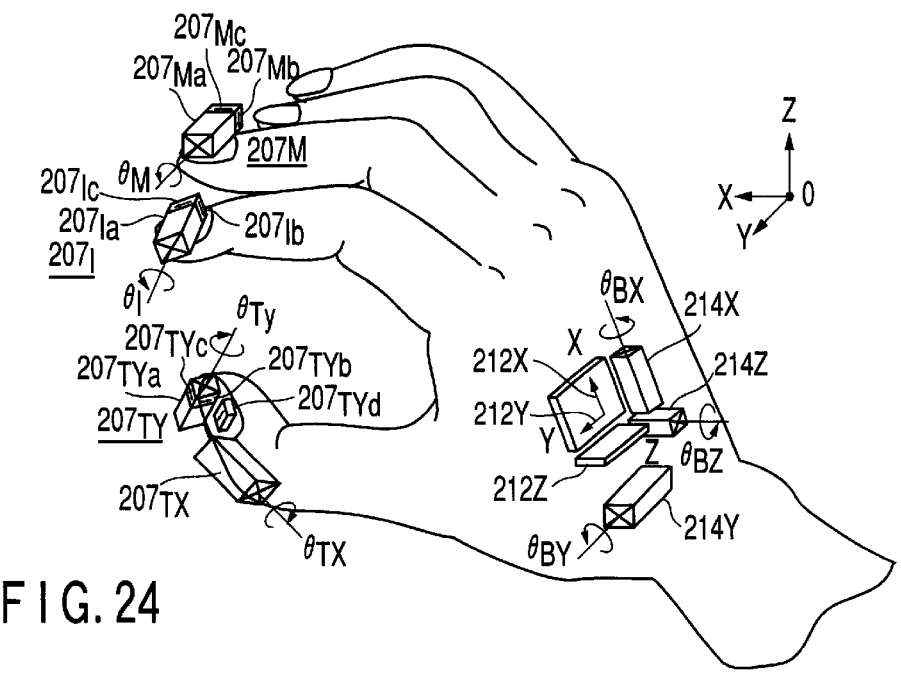
FIG. 24 is a diagram showing one example of the constitution of the operation input apparatus according to a seventh embodiment of the present invention.

A seventh embodiment of the posture detection apparatus and operation input apparatus of the present invention will be described hereinafter in detail with reference to the drawings. FIG. 24 is a diagram showing one example of the constitution of the posture detection apparatus according to the seventh embodiment of the present invention. FIG. 24 shows that the sensor is attached to the operator's right hand. A composite angle sensor 207M constituted by uniting a uniaxial angular speed sensor 207Ma with a biaxial acceleration sensor including a pair of uniaxial acceleration sensors 207Mb and 207Mc is attached to the middle finger end.

A composite angle sensor 207I constituted by uniting a uniaxial angular speed sensor 207Ia with a biaxial acceleration sensor including a pair of uniaxial acceleration sensors 207Ib and 207Ic is attached to the forefinger end. Furthermore, a composite angle sensor 207TY constituted by uniting a uniaxial angular speed sensor 207TYa with a biaxial acceleration sensor including a pair of uniaxial acceleration sensors 207TYb and 207TYc is attached to the thumb end. Additionally, a uniaxial angular speed sensor 207TX is attached to a middle portion of the thumb. A uniaxial acceleration sensor 207TYd is attached between the composite angle sensor 207TY and the uniaxial angular speed sensor 207TX.

The uniaxial angular speed sensors 207Ma, 207Ia, 207TYa are used to detect angle information around the Y-axis (pitch direction) of fingertip coordinate system XYZ. Moreover, the pair of uniaxial acceleration sensors 207Mb, 207Mc as the biaxial acceleration sensor attached to the middle finger are used to correct the drift included in the output of the uniaxial angular speed sensor 207Ma. The pair of uniaxial acceleration sensors 207Ib, 207Ic as the biaxial acceleration sensor attached to the forefinger are used to correct the drift included in the output of the uniaxial angular speed sensor 207Ia. The pair of uniaxial acceleration sensors 207Tyb, 207TYc as the biaxial acceleration sensor and the uniaxial acceleration sensor 207TYd constitute a triaxial acceleration sensor. This sensor is used to correct the drift included in the output of the uniaxial angular speed sensors 207TYa, 207TX.

Furthermore, in order to detect a position (Xb, Yb, Zb) and posture (pitch, roll, yaw) of the right hand back, acceleration sensors 212X, 212Y, 212Z and angular speed sensors 214X, 214Y, 214Z are attached to the right hand back. The acceleration sensors 212X, 212Y, 212Z are constituted of semiconductor acceleration sensors, and here the biaxial acceleration sensors 212X, 212Y and uniaxial acceleration sensor 212Z are combined and constituted. Moreover, a vibrating gyro sensor for detecting the angular speed of the uniaxial rotation direction is used as the angular speed sensors 214X, 214Y, 214Z.

In the present embodiment, in a system frequency used in a state in which the gravity vector axis agrees with the X-axis, the angular speed sensor (the uniaxial angular speed sensor 207Ma or 207Ia in FIG. 24) able to detect the rotation of the Y-axis direction in an XY horizontal surface is disposed. Additionally, the biaxial acceleration sensors (biaxial acceleration sensors 207Mb, 207Mc or 207Ib, 207Ic) able to detect the acceleration of the biaxial direction (X, Z) crossing at right angles to Y-axis) is disposed in order to correct the output drift of the angular speed sensor.

Furthermore, for the thumb, the biaxial angular speed sensor (the uniaxial angular speed sensor 207TYa or 207TX) for detecting the rotation angle (X-axis Y-axis rotation angle) of the XY axis plane of the thumb coordinate system is disposed. Additionally, the triaxial acceleration sensor (triaxial acceleration sensor including the pair of uniaxial acceleration sensors 207TYb, 207TYc and uniaxial acceleration sensor 207TYd) for detecting the acceleration of the XYZ axis direction is disposed.

Figure 25:
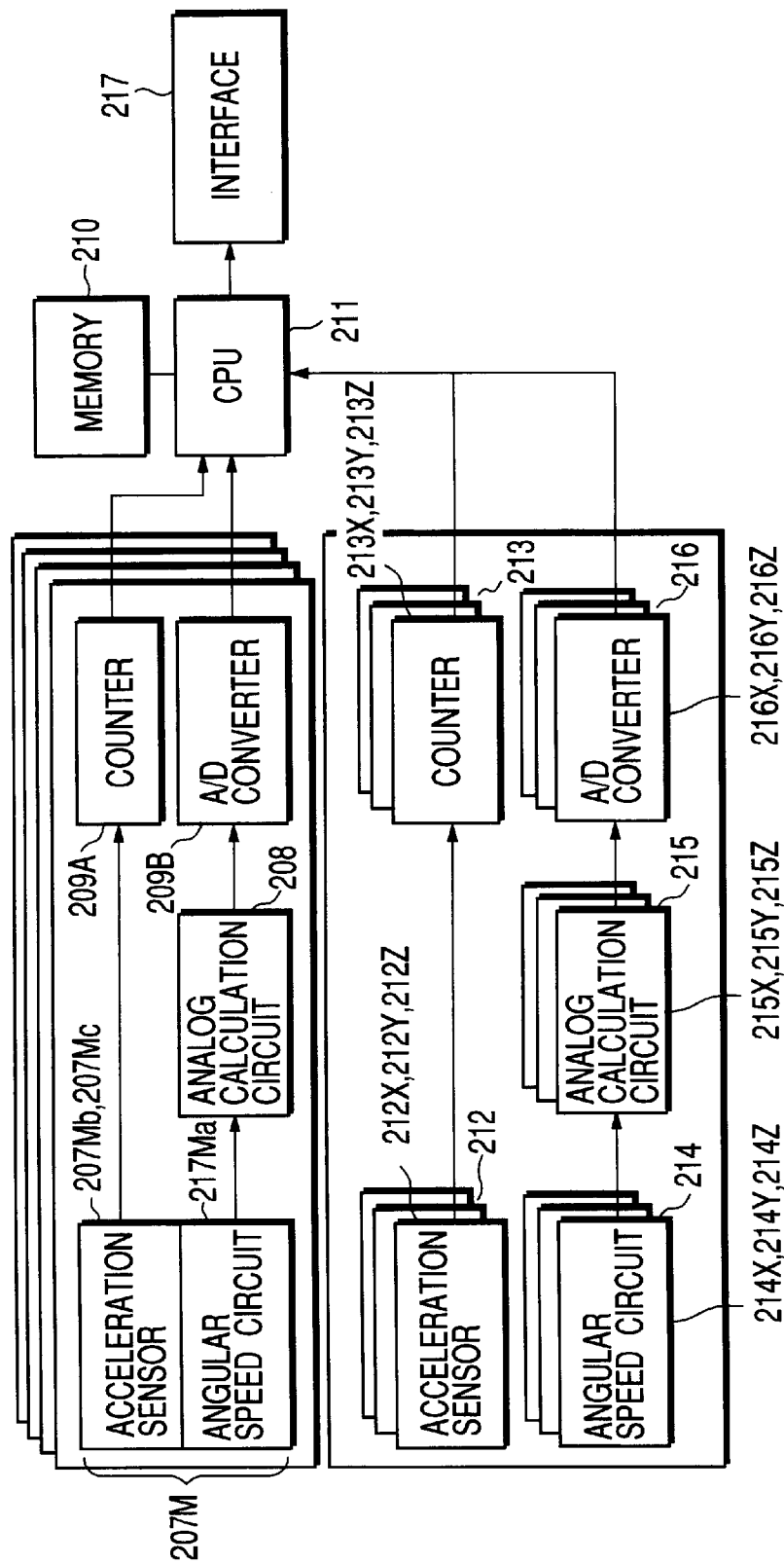
FIG. 25 is a block diagram showing the constitution of a signal processor for processing a signal detected by each sensor shown in FIG. 24.

FIG. 25 is a block diagram showing the constitution of a signal processor for processing a signal detected by each sensor shown in FIG. 24.

In FIG. 25, the composite angle sensor 207M attached particularly to the middle finger is shown. In actuality, however, the same number of composite sensors as the number of fingers including the thumb are arranged in parallel, and output signals are subjected to the following signal processing.

An analog calculation circuit 208 appropriately amplifies the angular speed signal of the angular speed sensor 207Ma and transmits the signal to an A/D converter 209B, so that the angular speed signal outputted from the angular speed sensor 207Ma is suitable for a conversion range of the A/D converter 209B. The A/D converter 209B converts an analog signal from the analog calculation circuit 208 into a digital signal. The angular speed signal converted by the A/D converter 209B is inputted as a CPU 211 as correction means. Additionally, the analog calculation circuit 208 has a band pass filter function for cutting unnecessary low-frequency and high-frequency signals from the angular speed signal.

The angular speed sensor 207Ma, analog calculation circuit 208, and A/D converter 209B constitute the finger posture detection means for detecting the posture of the fingertip of the operator's right hand.

Moreover, acceleration signals from the biaxial acceleration sensors 207Mb, 207Mc are subjected to pulse width modulation (PWM) and outputted. Therefore, when a duty ratio (ratio of pulse width H/L) of the signal is counted with a counter 209A, detected acceleration information can be converted. The acceleration signal converted by the counter circuit 209A is inputted to the CPU 211.

Furthermore, three acceleration sensors 212 (212X, 212Y, 212Z) on three axes crossing at right angles to one another, counters 213 (213X, 213Y, 213Z), three angular speed sensors 214 (214X, 214Y, 214Z) arranged on the same axes as those of the acceleration sensors 212 (212X, 212Y, 212Z), analog calculation circuits 215 (215X, 215Y, 215Z), and A/D converters 216 (216X, 216Y, 216Z) constitute hand back detection means for detecting the position and posture of the operator's right hand back.

The signal detected by the acceleration sensor 212 is subjected to pulse width modulation (PWM) and outputted.

Therefore, when the duty ratio (ratio of pulse width H/L) of the signal is counted with the counter 213, the detected acceleration information can be converted. The acceleration signal converted by the counter circuit 213 is inputted to the CPU 211. Moreover, the angular speed signal converted by the A/D converter 216 is inputted to the CPU 211.

Furthermore, the CPU 211 is connected to a memory 210 for storing detected data and an interface 217.

The CPU 211 has a function of hand shape estimation means, and estimates the shape of the whole hand of the operator based on the outputs of the hand back detection means and finger posture detection means. Moreover, the CPU 211 has a function of operation input analysis means, and uses the output of the hand shape estimation means to generate the command in the predetermined system. Furthermore, in the present embodiment, the CPU 211 has a function of correction means for using the output of the biaxial acceleration sensor (e.g., the pair of uniaxial acceleration sensors 207Mb, 207Mc attached to the middle finger) to correct the output of the posture detection means (e.g., the uniaxial angular speed sensor 207Ma attached to the middle finger).

Moreover, for the thumb, the CPU 211 uses the output of the triaxial acceleration sensor constituted of 207TYb, 207TYc, 207TYd to correct the outputs of the uniaxial angular speed sensors 207TYa and 207TX.

Figure 26:
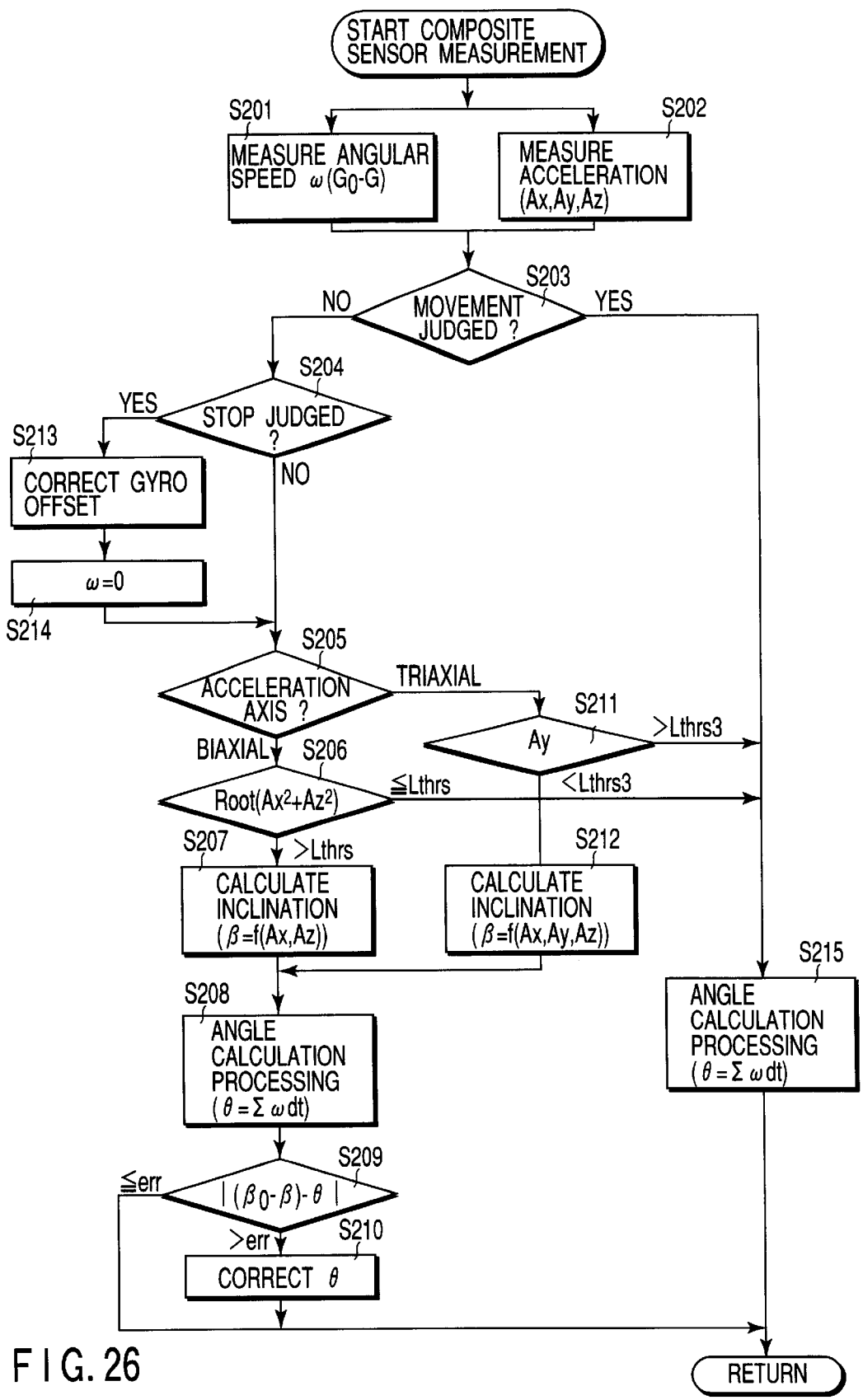
FIG. 26 is a flowchart showing a measurement procedure of a composite angle sensor according to the embodiment.

FIG. 26 is a flowchart showing a measurement procedure by the composite angle sensor according to the seventh embodiment.

The constitution of the uniaxial angular speed sensor and biaxial acceleration sensor of the fingertip posture means has been described above. A method (not shown) of the constitution of a triaxial acceleration sensor will be described hereinafter. In the constitution, another uniaxial acceleration sensor is disposed in the same Y-axis direction as that of the uniaxial angular speed sensor, that is, along an axis crossing at right angles to the biaxial acceleration sensor.

First, when power turns on or when a reset signal is inputted, an initialization operation is performed. In this case, the open hand is directed downward and momentarily stopped to perform the initialization operation. An inclination as the rotation angle around Y-axis obtained from the acceleration sensor during initialization is obtained as an initial angle position ($\beta 0$), and associated with the angle position ($\theta 0=0$) obtained from angular speed sensor information.

First, measurement of the angular speed $\omega$ by the uniaxial angular speed sensors 207Ma, 207Ia (step S201) and measurement of acceleration A by the acceleration sensors 207Mb, 207Mc, 207Ib, 207Ic (step S202) are performed in parallel. In the measurement of the angular speed $\omega$ of the step S01, G0 is considered as an offset value and a value G0-G is obtained. Moreover, in the measurement of the acceleration A of the step S202, an x-axis acceleration sensor vector Ax (207Mc, 207Ic), y-axis acceleration sensor vector Ay (for the triaxial acceleration sensor constitution), and z-axis acceleration sensor vector Az (207Mb, 207Ib) are obtained.

In steps S203 and S204, a change degree of a fingertip posture is judged based on measurement results of steps S201 and S202. First, it is judged in step S203 whether the change of the sensor signal of the fingertip posture detection means is not less than a threshold value. When it is judged that the change is not more than the threshold value, it is judged that the fingertip stops or moves slowly, and the flow advances to step S204. Moreover, when it is judged that the change is not less than the threshold value, it is judged that the fingertip moves relatively quickly, and the flow advances to step S215.

In step S215 the angular speed $\omega$ detected by the uniaxial angular speed sensor is integrated with time, angle information $\theta$ is obtained, and the processing returns from this processing flow.

It is judged in step S204 based on the measurement results of steps S201 and S202 whether the fingertip posture slowly changes or is stationary. This is judged by judging whether or not the change of the sensor signal of the fingertip posture detection means is not less than the threshold value. This threshold value is smaller than the threshold value of step S203. When it is judged that the fingertip is stationary, the process advances to gyro offset correction of step S213. The movement average value of the present value (G) of the uniaxial angular speed sensor itself or the value of a point of stop judgment up to now is updated as a gyro offset value (G0). The flow next advances to step S214, the present angular speed ($\omega$) is reset to zero, and the flow advances to step S205.

On the other hand, when it is judged in step S203 that the fingertip posture changes slowly, the flow advances to step S205.

In step S205, the flow changes depending upon the biaxial or triaxial constitution of the acceleration sensor. In the processing, when a hardware constitution is determined, either flow used may be defined. Alternatively, during operation, the constitutional state may be judged to carry out the flow.

It is judged in step S205 that the acceleration sensor is biaxial. Then, the flow advances to step S206 to obtain a square root of ($Ax^2+Az^2$) as an acceleration sensor vector length and to judge whether or not this value is larger than a predetermined threshold value Lthrs. Here, when the obtained acceleration sensor vector length is smaller than the predetermined threshold value Lthrs, the flow advances to the processing of step S215 without correcting the angle. Then, the angle information $\theta$ is obtained, and the flow returns from this processing. This is because with the biaxial constitution the acceleration vector of the Y-axis direction cannot be measured. Therefore, when an X-axis inclination $\alpha$ increases, a measurement error of the inclination angle of the Y-axis increases. In this case, it is judged that no correction is performed (precision is highest when the gravity vector exists in the XZ plane).

On the other hand, when it is judged in step S206 that the acceleration sensor vector length is larger than the predetermined threshold value Lthrs, the flow advances to step S207. In this step, the x-axis acceleration sensor vector Ax and z-axis acceleration sensor vector Az are used to obtain an inclination component $\beta$ to the Y-axis. Thereby, the inclination of the acceleration sensor in the gravity direction is obtained.

Subsequently, the flow advances to step S208 to integrate the angular speed $\omega$ detected by the uniaxial angular speed sensor with time and obtain the angle information $\theta$. The flow then advances to step S209.

Subsequently in step S209, when the fingertip posture changes, a difference between the present inclination component $\beta$ and inclination $\beta 0$ (initial angle position) of the acceleration sensor during initialization is compared with the angle information $\theta$ obtained in step S208. When the difference ($\theta err=(\beta 0-\beta)-\theta$) is larger than a predetermined threshold value err, the flow advances to step S210 to correct the present existing angle information $\theta$.

In the correction processing of step S210, $\theta err$ may be added to $\theta$ as it is for the correction. However, when the value $\theta err$ is larger, data jump increases. Therefore, a system may be selected in which a smaller value out of a correction amount θerr·1/n (n=2 to 3) and a displacement angle (dθ= ωdt) obtained by the present angular speed sensor is added as the correction amount.

As described above, in the seventh embodiment, the angle information θ is obtained by integrating the angular speed ω, and the information obtained by correcting the angle information with the inclination information (inclination component β) is used as fingertip angle information.

Moreover, it is judged in step S209 that the difference between the information is smaller than the predetermined threshold value err. In this case, the flow returns without correcting the information.

On the other hand, it is judged in step S205 that the acceleration sensor has the triaxial constitution, and the flow advances to step S211 to judge whether or not the Y-axis acceleration sensor vector Ay is larger than the predetermined threshold value Lthrs3. When the vector is smaller, the flow advances to step S212. In the step, X-axis acceleration sensor vector Ax, Y-axis acceleration sensor vector Ay, and Z-axis acceleration sensor vector Az are used to obtain the inclination component β. The aforementioned step S209 or steps S209 and S210 are executed.

Moreover, it is judged in step S211 that the Y-axis acceleration sensor vector Ay is larger than the predetermined threshold value Lthrs3. In this case, the angle correction processing is not performed. The flow advances to the processing of step S215. The angle information θ is obtained, and the flow returns from this movement. This is because the inclination α of the X-axis increases. When the Y-axis approaches the gravity axis, the rotation around the gravity axis cannot be detected by the acceleration sensor. However, in the triaxial acceleration sensor constitution, the information cannot be corrected only when the Y-axis is in the vicinity of the gravity vector axis. Moreover, there is supposedly a low probability that this situation occurs. As compared with the biaxial acceleration, the triaxial constitution has more correctable timings, and is more advantageous.

As described above, in the fingertip posture detection means, when the fingertip moves relatively quickly or when the information cannot be corrected with the acceleration sensor, the conventional posture detection means of only the angular speed sensor is utilized. However, when the fingertip moves slowly, the angular speed sensor can be corrected with the absolute value data obtained by the acceleration sensor. The uniaxial angular speed sensor information in the three-dimensional space is corrected when the gravity vector exists in the vicinity of the biaxial plane of the biaxial acceleration sensor. Therefore, the detection output error in posture detection can be corrected. Moreover, when the acceleration sensor has a triaxial constitution, the information can be corrected at more timings.

Subsequently, for the thumb, the output of the triaxial acceleration sensor constituted of 207TYb, 207TYc, 207TYd is used to correct the outputs of the uniaxial angular speed sensors 207TYa and 207TX. For a correction method, a method of correcting the uniaxial angular speed sensor with the triaxial acceleration sensor is applied to the biaxial angular speed sensor.

In addition to the angular speed sensor able to detect the rotation of the Y-axis direction in an XY horizontal surface of the thumb coordinate system XYZ (the uniaxial angular speed sensor 207TYa in FIG. 24), in order to correct the output drift of the angular speed sensor, the biaxial acceleration sensor able to detect the acceleration of the biaxial direction (X, Z) crossing at right angles to the Y-axis (biaxial acceleration sensors 207TYb, 207TYc in FIG. 24), and another uniaxial acceleration sensor (uniaxial acceleration sensor 207TYd in FIG. 24) constitute the triaxial acceleration sensor. Moreover, in addition to the angular speed sensor able to detect the rotation of the X-axis direction (the uniaxial angular speed sensor 207TX in FIG. 24), in order to correct the output drift of the angular speed sensor, the biaxial acceleration sensor able to detect the acceleration of the biaxial direction (Y, Z) crossing at right angles to the X-axis (biaxial acceleration sensors 207TYb, 207TYd in FIG. 24), and another uniaxial acceleration sensor (uniaxial acceleration sensor 207TYc in FIG. 24) constitute the triaxial acceleration sensor. That is, the triaxial acceleration sensor can correct the angular speed sensor of the XY axes similarly as in the aforementioned processing.

According to the aforementioned embodiments, there can be provided a posture detection apparatus which can accurately correct the detection output error in the posture detection. Moreover, there can be provided an operation input apparatus which can accurately correct the detection output error in the posture detection.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operation input apparatus comprising:
    hand back detection means, adapted to be attached to a back of a hand of an operator, for detecting at least one of an acceleration and an angular speed of the hand;
    finger posture detection means, adapted to be attached to a finger of the operator, for detecting a posture of the finger;
    hand shape estimation means for obtaining an overall shape of the hand of the operator based on outputs of the hand back detection means and the finger posture detection means;
    image pickup means for taking an image of an environment;
    comparison means for comparing images taken by the image pickup means at different time points;
    acquirement means for obtaining movement information of the hand based on a comparison result of the comparison means; and
    operation input analysis means for generating a predetermined command based on at least an output of the hand shape estimation means and an output of the acquirement means.

2. The operation input apparatus according to claim 1, wherein the image pickup means, the comparison means and the acquirement means are realized on one chip.

3. The operation input apparatus according to claim 2, wherein the chip is adapted to be attached to the back of the hand of the operator, and
    wherein the operation input apparatus has an operation mode for reflecting an output of the chip in the output of the hand back detection means.

4. The operation input apparatus according to claim 2, wherein the image pickup means, the comparison means and the acquirement means are realized on three chips, and the image pickup means takes images in three directions crossing at right angles to one another.

* * * * *